(12) United States Patent
Matsubara et al.

(10) Patent No.: US 7,952,977 B2
(45) Date of Patent: May 31, 2011

(54) OPTICAL PICKUP APPARATUS

(75) Inventors: Kazunori Matsubara, Shiki-gun (JP); Shinzoh Murakami, Kitakatsuragi-gun (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 594 days.

(21) Appl. No.: 12/036,013

(22) Filed: Feb. 22, 2008

(65) Prior Publication Data
US 2008/0205245 A1    Aug. 28, 2008

(30) Foreign Application Priority Data
Feb. 26, 2007    (JP) .................. 2007-046130

(51) Int. Cl.
*G11B 7/00*    (2006.01)
(52) U.S. Cl. ................. 369/112.04; 369/112.1
(58) Field of Classification Search .............. None
See application file for complete search history.

(56) References Cited

U.S. PATENT DOCUMENTS

| | | | |
|---|---|---|---|
| 6,654,336 B2 * | 11/2003 | Kadowaki et al. | ....... 369/112.07 |
| 2006/0262695 A1 | 11/2006 | Tsuchida et al. | |
| 2007/0025228 A1 | 2/2007 | Matsubara et al. | |
| 2007/0053272 A1 | 3/2007 | Watanabe et al. | |

FOREIGN PATENT DOCUMENTS

| | | |
|---|---|---|
| CN | 1905023 | 1/2007 |
| JP | 2004-303296 A | 10/2004 |
| JP | 2006-114151 | 4/2006 |
| JP | 2007-059031 A | 3/2007 |

* cited by examiner

*Primary Examiner* — Van N Chow
(74) *Attorney, Agent, or Firm* — Morrison & Foerster LLP

(57) ABSTRACT

A diffracting portion is disposed in an optical path between a light source and an optical disc. The diffracting portion diffracts the reflected light from recording layers of the optical disc toward a light receiving portion. The diffracting portion includes a first diffraction region having a first diffraction efficiency and a second diffraction region having a second diffraction efficiency lower than the first diffraction efficiency. The first diffraction region includes a FES diffracting portion and first to fourth TES diffracting portions. The second diffraction region includes fifth and sixth TES diffracting portions. First-order diffraction lights from the non-light-collecting recording layer enter on the fifth and the sixth TES diffracting portions, and are diffracted toward the light receiving portion by the fifth and the sixth TES diffracting portions.

10 Claims, 15 Drawing Sheets

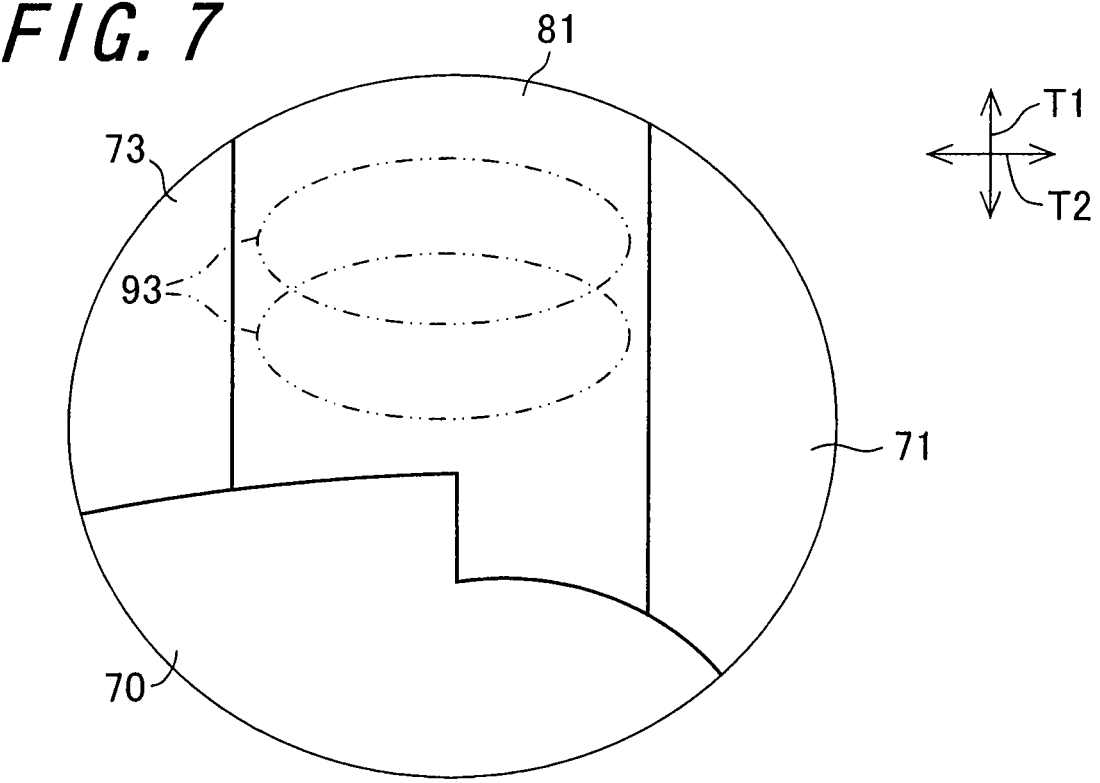

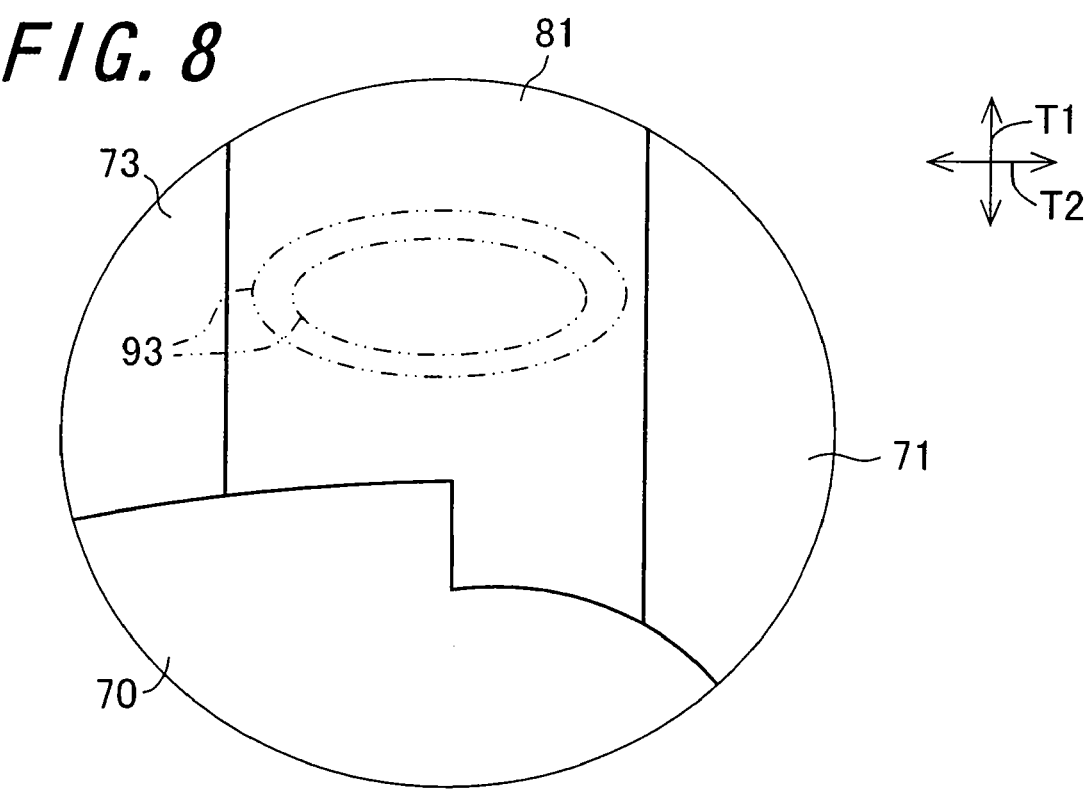

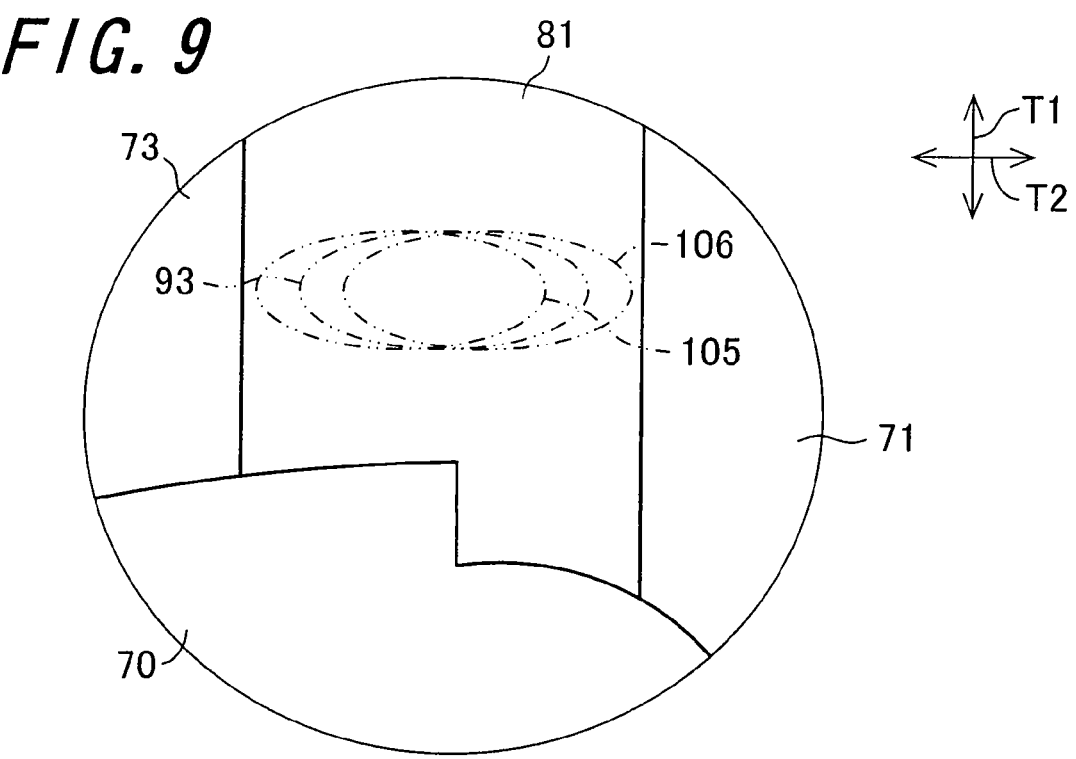

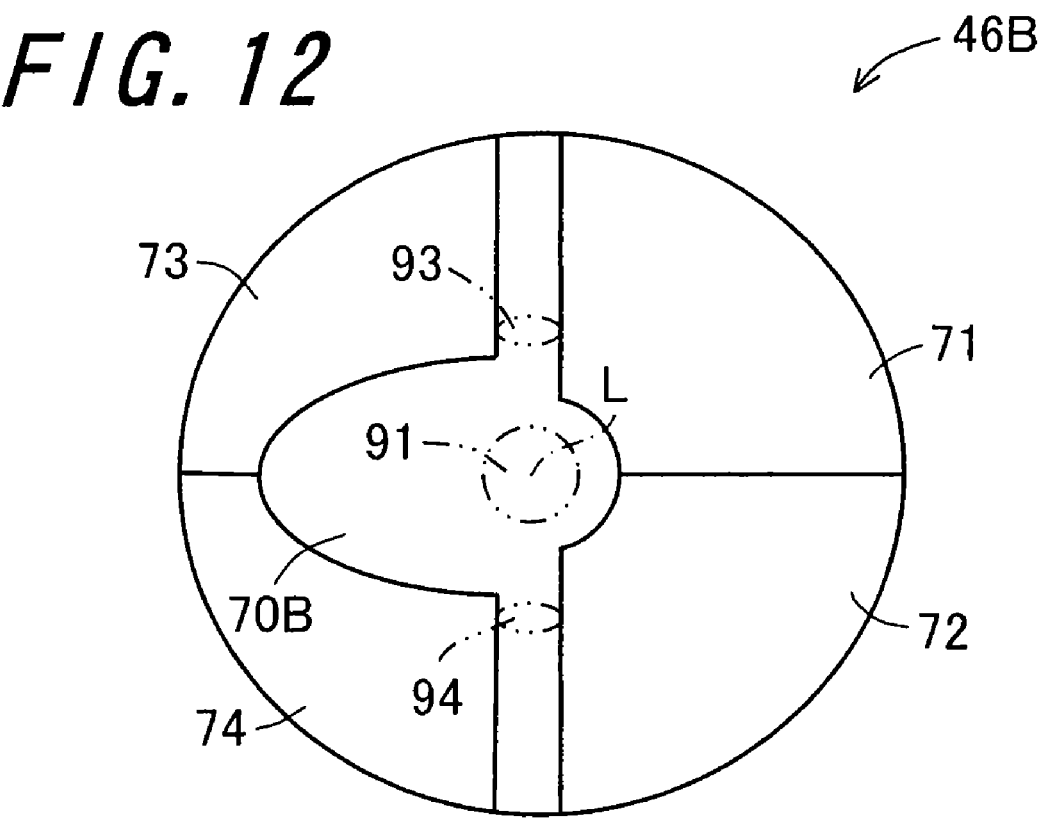
FIG. 12
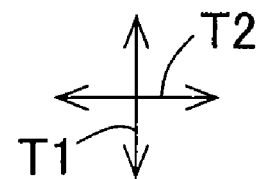

OPTICAL PICKUP APPARATUS

CROSS-REFERENCE TO RELATED APPLICATION

This application claims priority to Japanese Patent Application No. 2007-046130, which was filed on Feb. 26, 2007, the contents of which are incorporated herein by reference in its entirety.

BACKGROUND OF THE INVENTION

1. Field of the Invention

The present invention relates to an optical pickup apparatus for recording information on an optical recording medium or reproducing information from an optical recording medium.

2. Description of the Related Art

FIG. 13 is a view schematically showing a configuration of a conventional optical pickup apparatus 1. An optical disc 7 serving as an optical recording medium has a recording layer 8. When information is recorded and/or reproduced on and from such an optical disc 7, laser light is collected on the recording layer 8 of the optical disc 7 and the recording layer 8 is irradiated therewith, and then reflected light from the optical disc 7 is received by a light receiving portion 9. In this way, the information is recorded and/or reproduced, and servo control is carried out by detecting servo signals including a focusing error signal and a tracking error signal.

In the conventional optical pickup apparatus 1, light emitted from a light source 2 is split into a main light beam and a pair of sub light beams by a grating element 3, and which are transmitted through a hologram element 4, are collimated by a collimation lens 5, and thereafter are collected on the recording layer 8 of the optical disc 7 by the objective lens 6. The reflected light from the recording layer 8 of the optical disc 7 is transmitted through the objective lens 6 and the collimation lens 5, and the light thus transmitted is diffracted by the hologram element 4 and thereafter is received by the light receiving portion 9 in a state of being collected. Such a conventional optical pickup apparatus 1 as described above is disclosed in Japanese Unexamined Patent Publication JP-A 2004-303296.

FIG. 14 is a view showing a relation between the hologram element 4 and the light receiving portion 9. The light receiving portion 9 has a light receiving portion for focusing 11 that is used for generating a focusing error signal, and a pair of light receiving portions for tracking 12a and 12b that are used for generating a tracking error signal. The hologram element 4 has a diffracting portion for focusing 13 that is used for diffracting the reflected light from the recording layer 8 of the optical disc 7 toward the light receiving portion for focusing 11, and a pair of diffracting portions for tracking 14a and 14b that are used for diffracting the reflected light from the recording layer 8 of the optical disc 7 toward the respective light receiving portions for tracking 12a and 12b.

The optical disc 7 may have a plurality of recording layers 8 laminated in its thickness-wise direction for the purpose of increasing a recording capacity. In recording and/or reproducing the information on and from such an optical disc 7, the light receiving portion 9 not only receives reflected light from a light-collecting recording layer 8a which is currently involved in collection of the light emitted from the light source 2, but also undesirably receives reflected light from a non-light-collecting recording layer 8b that is another layer than the light-collecting recording layer 8a.

FIG. 15 is a view for explaining an overview of transmittance and reflection of light in the optical disc 7 having two recording layers 8. In FIG. 15, it is assumed that the non-light-collecting recording layer 8b is provided behind the light-collecting recording layer 8a when the optical disc 7 is viewed from a side where the light source 2 is located.

Light 16 emitted from the light source 2 is collected onto the light-collecting recording layer 8a and is reflected thereon. At this time, a part of the light 16 emitted from the light source 2 is transmitted through the light-collecting recording layer 8a. Transmitted light 17 that has been transmitted through the light-collecting recording layer 8a is reflected by the non-light-collecting recording layer 8b. In this case, the reflected light from the non-light-collecting recording layer 8b reaches the respective light receiving portions for tracking 12a and 12b, and is received undesirably by the respective light receiving portions for tracking 12a and 12b, with its diameter of light beam greater than that of the reflected light from the light-collecting recording layer 8a. As a result, this causes a problem of adverse effects on the tracking error signal.

SUMMARY OF THE INVENTION

An object of the invention is to provide an optical pickup apparatus capable of suppressing adverse effects caused by reflected light from a non-light-collecting recording layer.

The invention provides an optical pickup apparatus for irradiating an optical recording medium having a plurality of recording layers with light and recording information on a recording layer of the optical recording medium or reproducing information from the recording layer of the optical recording medium, the optical pickup apparatus comprising:

a light source for emitting light;

a lens system for collecting light emitted from the light source onto the recording layer of the optical recording medium and transmitting reflected light from the recording layer of the optical recording medium;

a light receiving portion for receiving the reflected light from the recording layer of the optical recording medium; and a diffracting portion for diffracting the reflected light from the recording layer of the optical recording medium toward the light receiving portion, the diffracting portion being disposed in an optical path between the light source and the optical recording medium, wherein the diffracting portion includes:

a first diffraction region having a first diffraction efficiency; and a second diffraction region having a second diffraction efficiency lower than the first diffraction efficiency, the second diffraction region being disposed so that first-order diffraction light from a non-light-collecting recording layer enters thereon, the non-light-collecting recording layer being another layer than a light-collecting recording layer which is currently involved in collection of the light emitted from the light source.

According to the invention, when information is recorded on a recording layer of the optical recording medium or is reproduced from the optical recording medium, the optical recording medium is irradiated with light. The light emitted from the light source is collected onto the recording layer of the optical recording medium by the lens system. The reflected light from the recording layer of the optical recording medium is transmitted through the lens system and thereafter is received by the light receiving portion.

The diffracting portion is disposed in the optical path between the light source and the optical recording medium. The diffracting portion is used for diffracting the reflected light from the recording layer of the optical recording medium toward the light receiving portion. The diffracting portion includes a first diffraction region having a first diffraction efficiency and a second diffraction region having a second diffraction efficiency lower than the first diffraction efficiency.

The first-order diffraction light from the non-light-collecting recording layer enters on the second diffraction region, and is diffracted by the second diffraction region toward the light receiving portion. In this way, it is possible to reduce a light-receiving amount of first-order diffraction light from the non-light-collecting recording layer received by the light receiving portion. Accordingly, it is possible to suppress the adverse effects caused by the first-order diffraction light from the non-light-collecting recording layer.

Reflected light from the light-collecting recording layer also enters on the second diffraction region. A part of the light that has entered on the second diffraction region reaches the light receiving portion. Accordingly, it is possible to utilize the reflected light from the light-collecting recording layer more effectively, compared with a case where the light which has entered on the second diffraction region is completely prevented from reaching the light receiving portion.

Further, in the invention, it is preferable that the lens system has a light collecting element that is driven to be displaced in a tracking direction, and the second diffraction region is disposed so that the first-order diffraction light from the non-light-collecting recording layer enters thereon even when the light collecting element is driven to be displaced in the tracking direction.

According to the invention, the first-order diffraction light from the non-light-collecting recording layer enters on the second diffraction region even when the light collecting element is driven to be displaced in the tracking direction. Accordingly, regardless of the displacement of the light collecting element, it is possible to suppress the adverse effects caused by the first-order diffraction light from the non-light-collecting recording layer.

Further, in the invention, it is preferable that the second diffraction region is disposed so that the first-order diffraction light from the non-light-collecting recording layer enters thereon even when a radiation range of the light emitted from the light source formed on the non-light-collecting recording layer is changed.

According to the invention, the first-order diffraction light from the non-light-collecting recording layer enters on the second diffraction region even when the radiation range of the light emitted from the light source formed on the non-light-collecting layer is changed. For example, a change in an interval between the light-collecting recording layer and the non-light-collecting recording layer causes a change in the radiation range of the light emitted from the light source formed on the non-light-collecting layer. In the invention, regardless of such a change in the radiation range as mentioned above, it is possible to suppress the adverse effects caused by the first-order diffraction light from the non-light-collecting recording layer.

Further, in the invention, it is preferable that the first diffraction region includes a region on which zero-order diffraction light from the non-light-collecting recording layer enters.

Further, according to the invention, the first diffraction region includes the region on which the zero-order diffraction light from the non-light-collecting recording layer enters. The region on which the zero-order diffraction light from the non-light-collecting recording layer enters, is a region that is near a reference optical axis of the lens system and that is important in using the reflected light from the light-collecting recording layer. In the invention, this region is included in the first diffraction region, resulting in that it is possible to effectively utilize the reflected light from the light-collecting recording layer.

Further, in the invention, it is preferable that the second diffraction region includes a region on which the zero-order diffraction light from the non-light-collecting recording layer enters, and a region on which the first-order diffraction light from the non-light-collecting recording layer enters.

According to the invention, the second diffraction region includes the region on which the zero-order diffraction light from the non-light-collecting recording layer enters, and the region on which the first-order diffraction light from the non-light-collecting recording layer enters. Since the second diffraction region is thus configured, number of dividing the diffracting portion can be reduced. Consequently, it is possible to decrease number of manufacturing steps of the diffracting portion, thus making it possible to reduce manufacturing cost.

Further, in the invention, it is preferable that a depth of grating groove in the first diffraction region is different from that of grating groove in the second diffraction region.

According to the invention, it is possible to set the first diffraction efficiency of the first diffraction region and the second diffraction efficiency of the second diffraction region according to the depths of the grating grooves, respectively.

Further, in the invention, it is preferable that the first diffraction region and the second diffraction region have different duty ratios.

According to the invention, it is possible to set the first diffraction efficiency of the first diffraction region and the second diffraction efficiency of the second diffraction region according to the duty ratios.

Further, in the invention, it is preferable that the light receiving portion has a light receiving portion for tracking that is used for generating a tracking error signal, and the second diffraction region diffracts the reflected light from the recording layer of the optical recording medium toward the light receiving portion for tracking.

According to the invention, the light that has been diffracted by the second diffraction region reaches the light receiving portion for tracking. Accordingly, it is possible to prevent the first-order diffraction light from the non-light-collecting recording layer from giving the adverse effects on the tracking error signal. In addition, it is also possible to utilize the reflected light from the light-collecting recording layer more effectively, compared with a case where the light that has entered on the second diffraction region is completely prevented from reaching the light receiving portion.

Further, in the invention, it is preferable that the light receiving portion has a light receiving portion for focusing that is used for generating a focusing error signal, and the second diffraction region diffracts the reflected light from the recording layer of the optical recording medium toward the light receiving portion for focusing.

According to the invention, the light that has been diffracted by the second diffraction region reaches the light receiving portion for focusing. Accordingly, it is possible to prevent the first-order diffraction light from the non-light-collecting recording layer from giving the adverse effects on the focusing error signal. In addition, it is also possible to utilize the reflected light from the light-collecting recording layer more effectively, compared with a case where the light that has entered on the second diffraction region is completely prevented from reaching the light receiving portion.

Further, in the invention, it is preferable that the optical pickup apparatus further comprises a light splitting portion for splitting the light emitted from the light source into a main light beam and a sub light beam, and the second diffraction region is disposed so that both the first-order diffraction light of the main light beam from the non-light-collecting recording layer, and the first-order diffraction light of the sub light beam from the non-light-collecting recording layer, enter thereon.

According to the invention, the light emitted from the light source is split into the main light beam and the sub light beam by the light splitting portion. The second diffraction region is disposed so that both the first-order diffraction light of the main light beam from the non-light-collecting recording layer, and the first-order diffraction light of the sub light beam from the non-light-collecting recording layer enter. As a result, it is possible to suppress as feasibly as possible the adverse effects caused by the reflected light from the non-light-collecting recording layer.

Further, in the invention, it is preferable that the optical pickup apparatus further comprises a light splitting portion for splitting the light emitted from the light source into a main light beam and a sub light beam, the second diffraction region is disposed so that the first-order diffraction light of the main light beam from the non-light-collecting recording layer enters thereon while a part of the first-order diffraction light of the sub light beam from the non-light-collecting recording layer does not enter thereon, and the first diffraction region is disposed so that the part of the first-order diffraction light of the sub light beam from the non-light-collecting recording layer enters thereon.

According to the invention, the light emitted from the light source is split into a main light beam and a sub light beam by the splitting portion. The main light beam has a high light intensity, whereas the sub light beam has a low light intensity. Accordingly, the adverse effects caused by the first-order diffraction light of the main light beam from the non-light-collecting recording layer are large, whereas the adverse effects caused by the first-order diffraction light of the sub light beam from the non-light-collecting recording layer are small.

In view of this point, the second diffraction region is disposed so that the first-order diffraction light of the main light beam from the non-light-collecting recording layer enters thereon. As a result, it is possible to effectively suppress the adverse effects caused by the reflected light from the non-light-collecting recording layer. In addition, the first diffraction region and the second diffraction region are disposed so that the part of the first-order diffraction light of the sub light beam from the non-light-collecting recording layer deviates from the second diffraction region and enters on the first diffraction region. Consequently, it is possible to effectively utilize the reflected light from the light-collecting recording layer, by making the first diffraction region as large as possible so that the reflected light from the light-collecting recording layer is diffracted by the first diffraction region as much as possible.

BRIEF DESCRIPTION OF DRAWINGS

Other and further objects, features, and advantages of the invention will be more explicit from the following detailed description taken with reference to the drawings wherein:

FIG. 7 is an enlarged front view of Section I in FIG. 5;

FIG. 8 is an enlarged front view of Section I in FIG. 5;

FIG. 9 is an enlarged front view of Section I in FIG. 5;

FIG. 12 is a front view showing a configuration of a diffracting portion provided in an optical pickup apparatus according to a fourth embodiment of the invention;

DETAILED DESCRIPTION

Figure 1:
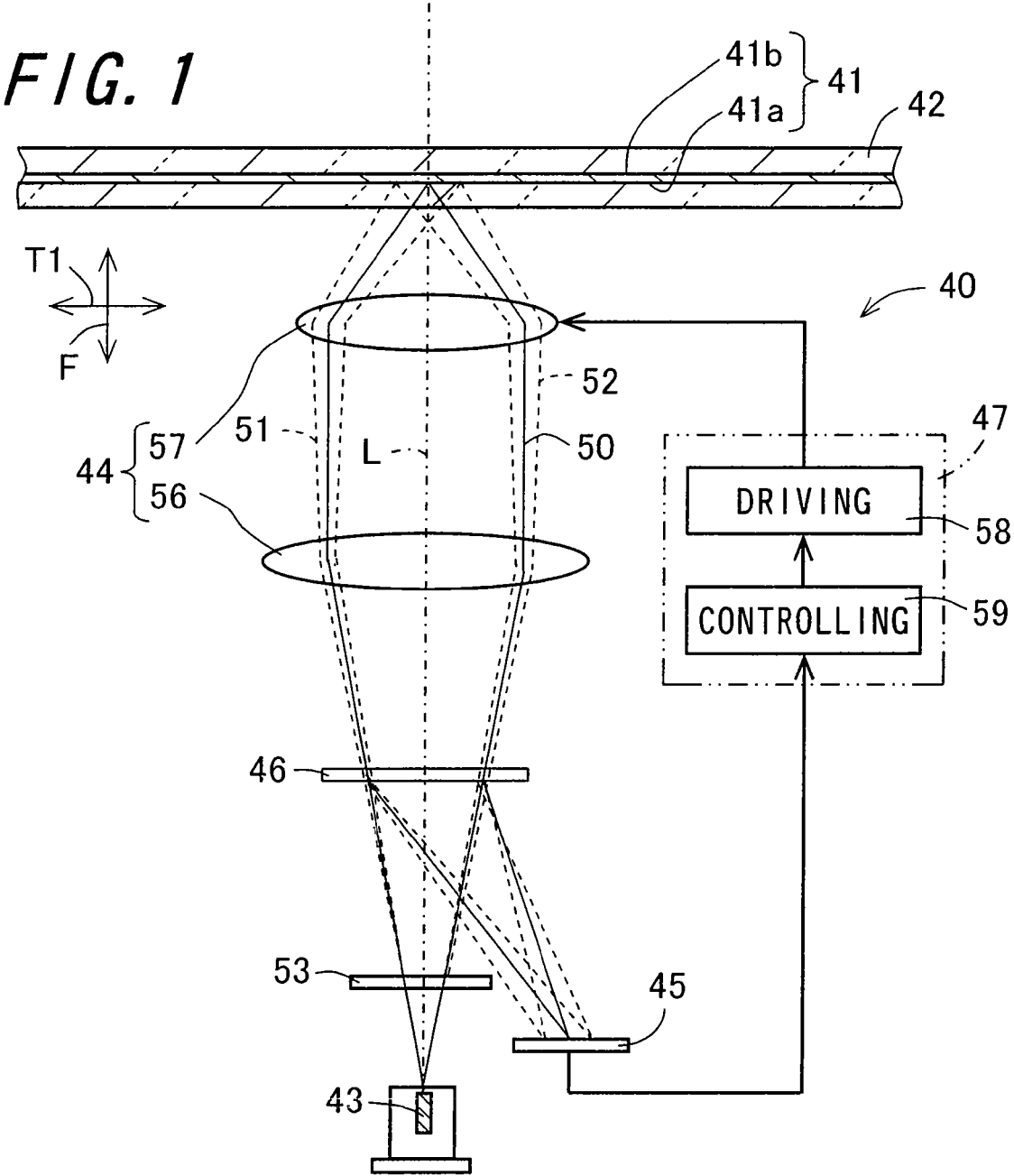
FIG. 1 is a view schematically showing a configuration of an optical pickup apparatus according to a first embodiment of the invention.

Now referring to the drawings, preferred embodiments of the invention are described below.

FIG. 1 is a view schematically showing a configuration of an optical pickup apparatus 40 according to a first embodiment of the invention. The optical pickup apparatus 40 according to the embodiment is used for irradiating an optical disc 42 having a plurality of recording layers 41 with light from one side of the optical disc 42 so as to record information on the recording layers 41 of the optical disc 42 or reproduce the information from the optical disc 42.

The optical disc 42 is an optical recording medium. The respective recording layers of the optical disc 42 are laminated in a thickness direction of the optical disc 42. The reproduction layer 41 of the reproduction-only optical disc 42 has spirally formed pit rows, and a track is formed by the pit rows. In such a reproduction-only optical disc 42 as mentioned above, information is represented by the pits. The recording layer 41 of the record-only optical disc 42 has spirally formed lands and grooves, and the track is formed by the lands and the grooves. In such a record-only optical disc 42 as mentioned above, information is represented by a recording mark which is formed by the lands or the grooves.

Examples of the optical disc 42 include a digital versatile disc (abbreviated as DVD). In the embodiment, descriptions will be made on the assumption that the optical disc 42 is the DVD called single-sided double-layer disc. Hereinafter, among the respective recording layers 41 of the optical disc 42, a recording layer 41 which is currently involved in collection of light emitted from a light source 43 described later is referred to as a light-collecting recording layer 41*a*, and a recording layer 41 that is another layer than the light-collecting recording layer 41*a* is referred to as a non-light-collecting recording layer 41*b*.

The optical pickup apparatus 40 includes the light source 43 for emitting light, a lens system 44 for collecting the light emitted from the light source 43 onto the recording layers 41 of the optical disc 42 and transmitting reflected light from the recording layers 41 of the optical disc 42, a light receiving portion 45 for receiving the reflected light from the recording layer 41 of the optical disc 42, a diffracting portion 46 that is disposed in an optical path between the light source 43 and the optical disc 42 and is used for diffracting the reflected light from the recording layers 41 of the optical disc 42 toward the light receiving portion 45, and an adjusting portion 47 for adjusting a light collection position of the light collected by the lens system 44 based on a light receiving result detected by the light receiving portion 45. In addition, the optical pickup apparatus 40 further includes a light splitting portion 53 for splitting the light emitted from the light source 43 into a main light beam 50 and a pair of sub light beams 51 and 52. Such an optical pickup apparatus 40 as mentioned above is disposed so that a reference optical axis L of the lens system 44 is orthogonal to the optical disc 42 that is rotated by a spindle motor.

The light source 43 is realized by a laser diode. Light of a wavelength region suitable for recording and reproducing on and from the optical disc 42 is emitted from the light source 43. In the embodiment, the optical disc 42 is the DVD, and therefore a laser diode is used as the light source 43, which emits light of a wavelength within a wavelength region around 650 nm suitable for recording and reproducing on and from the DVD. The wavelength region around 650 nm is a red wavelength region.

The light splitting portion 53 is realized by a grating element. The light splitting portion 53 diffracts the light emitted from the light source 43, and splits the light thus diffracted into the main light beam 50 and the pair of sub light beams 51 and 52. The light splitting portion 53 has grating grooves arranged with equal intervals secured therebetween. The main light beam 50 is zero-order diffraction light that is not diffracted by the light splitting portion 53. The sub light beams 51 and 52 are ±first-order diffraction lights, respectively. On the recording layer 41 of the optical disc 42, irradiation ranges of the respective sub light beams 51 and 52 are respectively located on either side of irradiation range of the main light beam 50 in a tracking direction T1 and on either side of the irradiation range of the main light beam 50 in a tangential direction T2. The tracking direction T1 and the tangential direction T2 are orthogonal to the reference optical axis L, and are orthogonal to each other. The tracking direction T1 corresponds to a radial direction of the optical disc 42. The tangential direction T2 corresponds to a tangential direction of the optical disc 42.

The lens system 44 has a collimation lens 56 and an objective lens 57. The collimation lens 56 is used for collimating the light beams 50, 51, and 52 from the light splitting portion 53, respectively. The objective lens 57 serves as a light collecting element for collecting the respective light beams 50, 51, and 52 from the collimation lens 56 onto the recording layer 41 of the optical disc 42. An optical axis of the collimation lens 56 is coaxial with the reference optical axis L. The objective lens 57 is driven to be displaced in a focusing direction F and the tracking direction T1, within a movable range including a center valve position. The optical axis of the objective lens 57 is coaxial with the reference optical axis L at the center valve position. The focusing direction F is a direction which extends along the reference optical axis L, and along which the objective lens 57 moves to or away from the optical disc 42.

The adjusting portion 47 has a driving portion 58 for driving the objective lens 57 to be displaced in the focusing direction F and the tracking direction T1, and a controlling portion 59 for controlling the driving portion 58 based on the light receiving result produced by the light receiving portion 45. The controlling portion 59 generates a focusing error signal, a tracking error signal, and the like, based on the light receiving result produced by the light receiving portion 45, so as to carry out a focusing servo control and a track servo control based on these signals. In this way, the objective lens 57 can be driven to be displaced in the focusing direction F and the tracking direction T1 by the driving portion 58 so that the light collection position of the objective lens 57 follows a track of the light-collecting recording layer 41a.

Figure 2:
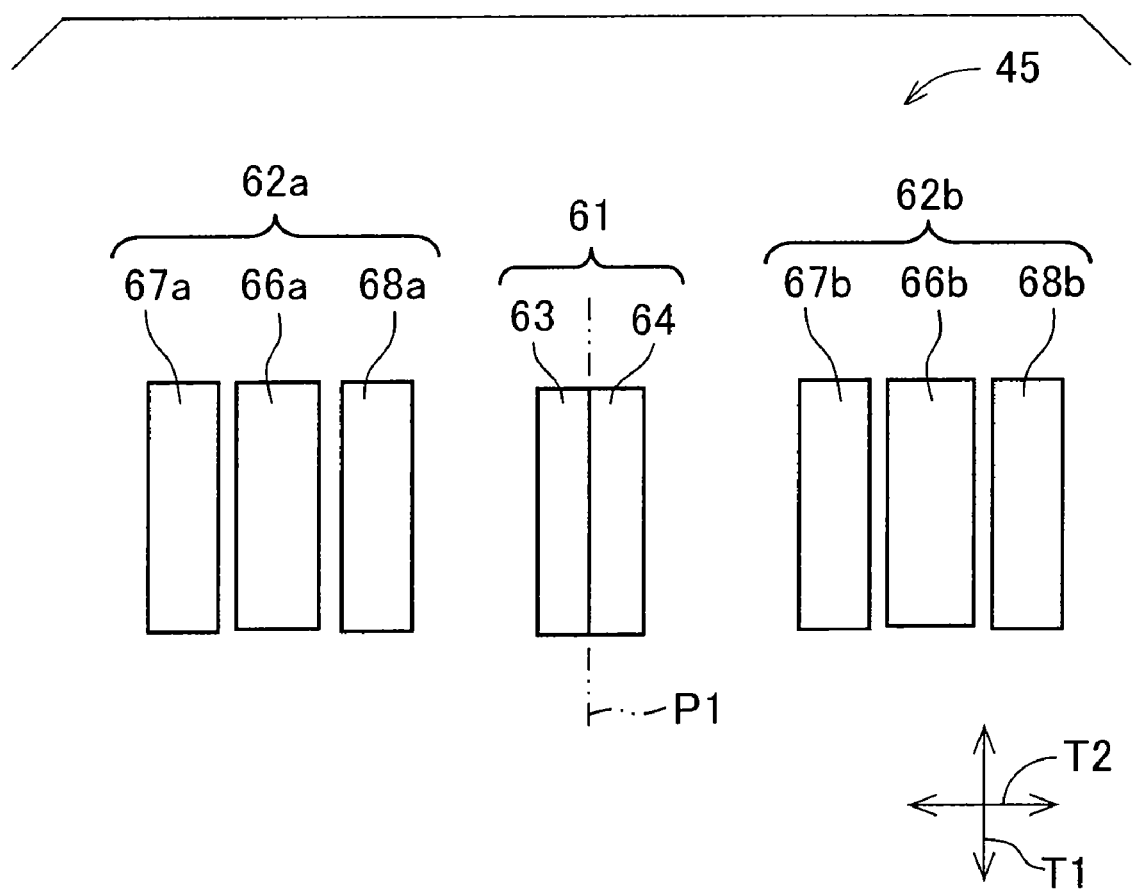
FIG. 2 is a front view showing a configuration of a light receiving portion.

FIG. 2 is a front view showing a configuration of the light receiving portion 45. The light receiving portion 45 has a light receiving portion for focusing 61 that is used for generating the focusing error signal, and a pair of light receiving portions for tracking 62a and 62b that are used for generating the tracking error signal. The light receiving portion for focusing 61 and the respective light receiving portions for tracking 62a and 62b are arranged in the tangential direction T2. The light receiving portion for focusing (hereinafter, referred to as "FES light receiving portion") 61 is arranged in the same position with the reference optical axis L with respect to the tangential direction T2. One of the light receiving portions for tracking (hereinafter, referred to as "first TES light receiving portion") 62a is arranged on one side of the FES light receiving portion 61 in the tangential direction T2 with a distance secured therebetween. The other light receiving portion for tracking (hereinafter, referred to as "second TES light receiving portion") 62b is arranged on the other side of the FES light receiving portion 61 in the tangential direction T2 with a distance secured therebetween.

The FES light receiving portion 61 has a pair of main light beam receiving elements 63 and 64 which are arranged in a position where the light of the main light beam 50 reflected from the light-collecting recording layer 41a is collected and which are used for receiving the light of the main light beam 50 reflected from the light-collecting recording layer 41a. The main light beam receiving elements 63 and 64 are adjacent to each other in the tangential direction T2 with no gap secured therebetween. A boundary line 65 between the main light beam receiving elements 63 and 64 is included in a first virtual plane P1. The first virtual plane P1 includes the reference optical axis L and is orthogonal to the tangential direction T2. Hereinafter, the main light beam receiving element that is located on one side with respect to the first virtual plane P1 is referred to as a first main light beam receiving element 63, and the main light beam receiving element that is located on the other side with respect to the first virtual plane P1 is referred to as a second main light beam receiving element 64.

The first TES light receiving portion 62a has a main light beam receiving element 66a and a pair of sub light beam receiving elements 67a and 68a. The main light beam receiving element 66a is arranged in a position where the reflected light of the main light beam 50 from the light-collecting recording layer 41a is collected, and is designed for receiving the reflected light of the main light beam 50 from the light-collecting recording layer 41a. The pair of sub light beam receiving elements 67a and 68a are arranged in positions where the reflected lights of the respective sub light beams 51 and 52 from the light-collecting recording layer 41a are collected, and are used for receiving the reflected lights of the respective sub light beams 51 and 52 from the light-collecting recording layer 41a. The main light beam receiving element 66a and the respective sub light beam receiving elements 67a and 68a are arranged in the tangential direction T2. One of the sub light beam receiving elements (hereinafter, referred to as "first sub light beam receiving element") 67a is arranged on one side of the main light beam receiving element 66a in the tangential direction T2 with a gap secured therebetween. The other sub light beam receiving element (hereinafter, referred to as "second sub light beam receiving element") 68a is arranged on the other side of the main light beam receiving element 66a in the tangential direction T2 with a gap secured therebetween.

Since the second TES light receiving portion 62b is the same as the first TES light receiving portion 62a, descriptions will be omitted to avoid duplication and the same reference symbols will be used to refer to portions corresponding to those in the latter, except that "b" is appended to the reference numerals instead of "a".

The light receiving elements 63, 64, 66a to 68a, and 66b to 68b in the light receiving portion 45 each have a light receiving surface formed in approximately rectangular shape. The light receiving surfaces of the respective light receiving elements 63, 64, 66a to 68a, and 66b to 68b extend in the tracking direction T1. The light receiving elements 63, 64, 66a to 68a, and 66b to 68b are realized by photodiodes, respectively. Such a light receiving portion 45 as has been described above detects a light intensity.

Figure 3:
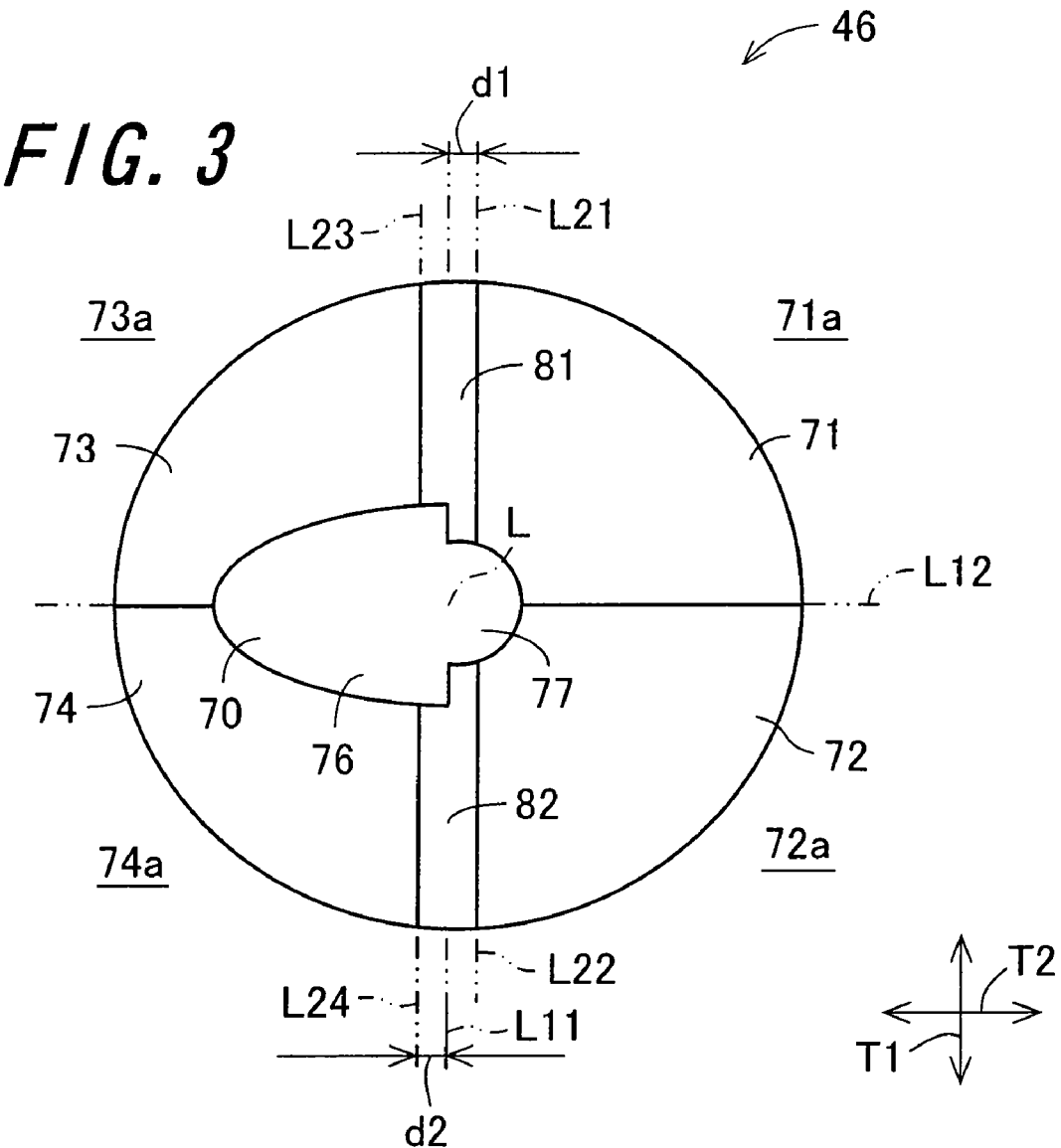
FIG. 3 is a front view showing a configuration of a diffracting portion.

FIG. 3 is a front view showing a configuration of the diffracting portion 46. The diffracting portion 46 is realized by a hologram element. The diffracting portion 46 is disposed along a second virtual plane perpendicular to the reference optical axis L. The diffracting portion 46 is so formed as to include a passing region through which the reflected light from the light-collecting recording layer 41a passes when viewed from a direction which extends along the reference optical axis L. In the embodiment, when viewed from the direction extending along the reference optical axis L, the diffracting portion 46 is formed in a circular outer shape centering about the reference optical axis L.

The diffracting portion 46 includes a first diffraction region having a first diffraction efficiency, and a second diffraction region that has a second diffraction efficiency lower than the first diffraction efficiency and that is disposed so that first-order diffraction light from the non-light-collecting recording layer 41b enters thereon. The first diffraction region and the second diffraction region are disposed along the second virtual plane. A plurality of grating grooves are formed in the first diffraction region and the second diffraction region. A hologram pattern is formed of these grating grooves.

The second virtual plane is divided by a first boundary line L11 and a second boundary line L12. The first boundary line L11 is orthogonal to the reference optical axis L and extends in the tracking direction T1, within the second virtual plane. The second boundary line L12 is orthogonal to the reference optical axis L and extends in the tangential direction T2, within the second virtual plane.

The first diffraction region has a diffracting portion for focusing 70 and first to fourth diffracting portion for tracking 71 to 74. The diffracting portion for focusing 70 is used for diffracting the reflected light from the light-collecting recording layer 41a toward the FES light receiving portion 61. The first to fourth diffracting portion for tracking 71 to 74 are used for diffracting respectively the reflected light from the light-collecting recording layer 41a toward the first and the second TES light receiving portions 62a and 62b.

A large part of the diffracting portion for focusing (hereinafter, referred to as "FES diffracting portion") 70 is arranged on one side with respect to the first boundary line L11. The FES diffracting portion 70 has a main body portion 76 and a projected portion 77. The main body portion 76 is arranged on the one side with respect to the first boundary line L11. The projected portion 77 is connected to the main body portion 76 and protrudes from the main body portion toward the other side with respect to the first boundary line L11.

The main body portion 76 is a semielliptic, which is either of two parts obtained by dividing an ellipse in halves by its minor axis. The minor axis of the main body portion 76 corresponds to the first boundary line L11 and the center between both ends of the minor axis corresponds to an intersection point between the second virtual plane and the reference optical axis L. A dimension of the main body portion 76 in its longitudinal direction is smaller than a radius of the whole diffracting portion 46.

The projected portion 77 is a semicircle, which is either of two parts obtained by dividing a circle in halves by its diameter. The diameter of the projected portion 77 corresponds to the first boundary line L11 and the center between both ends of the diameter corresponds to the intersection point between the second virtual plane and the reference optical axis L. A radius of the projected portion 77 is smaller than the dimension of the main body portion 76 when viewed in the direction of the minor axis of the main body portion 76 and is greater than a predetermined first distance d1 which will be described later on.

The first diffracting portion for tracking (hereinafter, referred to as "first TES diffracting portion") 71 is arranged in a first divided region 71a that is located on the other side with respect to the first boundary line L11 and on one side with respect to the second boundary line L12. The first TES diffracting portion 71 is formed such that an overlapping part with a portion between the first boundary line L11 and a first virtual line L21 in parallel with the first boundary line L11, and an overlapping part with the FES diffracting portion 70 are removed from a sectorial portion which belongs to the first divided region 71a in the whole diffracting portion 46. The first virtual line L21 is spaced from the first boundary line L11 toward the other side of the first boundary line L11 by the predetermined first distance d1.

The second diffracting portion for tracking (hereinafter, referred to as "second TES diffracting portion") 72 is arranged in a second divided region 72a that is located on the other side with respect to the first boundary line L11 and on the one side with respect to the second boundary line L12. The second TES diffracting portion 72 is formed such that an overlapping part with a portion between the first boundary line L11 and a second virtual line L22 in parallel with the first boundary line L11, and an overlapping part with the FES diffracting portion 70 are removed from a sectorial portion which belongs to the second divided region 72a in the whole diffracting portion 46. The second virtual line L22 forms a common straight line with the first virtual line L21, and thus the second virtual line L22 is spaced from the first boundary line L11 toward the other side of the first boundary line L11 by the predetermined first distance d1.

The third diffracting portion for tracking (hereinafter, referred to as "third TES diffracting portion") 73 is arranged in a third divided region 73a that is located on the one side with respect to the first boundary line L11 and on the one side with respect to the second boundary line L12. The third TES diffracting portion 73 is formed such that an overlapping part with a portion between the first boundary line L11 and a third virtual line L23 in parallel with the first boundary line L11, and an overlapping part with the FES diffracting portion 70 are removed from a sectorial portion which belongs to the third divided region 73a in the whole diffracting portion 46. The third virtual line L23 is spaced from the first boundary line L11 toward the one side of the first boundary line L11 by a predetermined second distance d2.

The fourth diffracting portion for tracking (hereinafter, referred to as "fourth TES diffracting portion") 74 is arranged in a fourth divided region 74a that is located on the one side with respect to the first boundary line L11 and on the other side with respect to the second boundary line L12. The fourth TES diffracting portion 74 is formed such that an overlapping part with a portion between the first boundary line L11 and a fourth virtual line L24 in parallel with the first boundary line L11, and an overlapping part with the FES diffracting portion 70 are removed from a sectorial portion which belongs to the fourth divided region 74a in the whole diffracting portion 46. The fourth virtual line L24 forms a common straight line with the third virtual line L23, and thus the fourth virtual line L24 is spaced from the first boundary line L11 toward the one side of the first boundary line L11 by the predetermined second distance d2.

The second diffraction region has fifth and sixth diffracting portions for tracking 81 and 82 for diffracting the reflected light from the light-collecting recording layer 41a toward the first and second TES light receiving portions 62a and 62b, respectively. The fifth and the sixth diffracting portions for tracking 81 and 82 are formed such that the FES diffracting portion 70 and the first to the fourth TES diffracting portions 71 to 74 are removed from the whole diffracting portion 46.

The fifth diffracting portion for tracking (hereinafter, referred to as "fifth TES diffracting portion") 81 is so arranged as to be interposed between the first TES diffracting portion 71 and the third TES diffracting portion 73, and to bridge a gap between the first divided region 71a and the third divided region 73a. The fifth TES diffracting portion 81 is formed such that an overlapping part with the FES diffracting portion 70 is removed from a portion which is located between the first virtual line L21 and the third virtual line L23 and which is located on the one side of the second boundary line L12 in the whole diffracting portion 46.

The sixth diffracting portion for tracking (hereinafter, referred to as "sixth TES diffracting portion") 82 is so arranged as to be interposed between the second TES diffracting portion 72 and the fourth TES diffracting portion 74, and to bridge a gap between the second divided region 72a and the fourth divided region 74a. The sixth TES diffracting portion 82 is formed such that an overlapping part with the FES diffracting portion 70 is removed from a portion which is between the second virtual line L22 and the fourth virtual line L24 and which is located on the other side of the second boundary line L12 in the whole diffracting portion 46.

Figure 4:
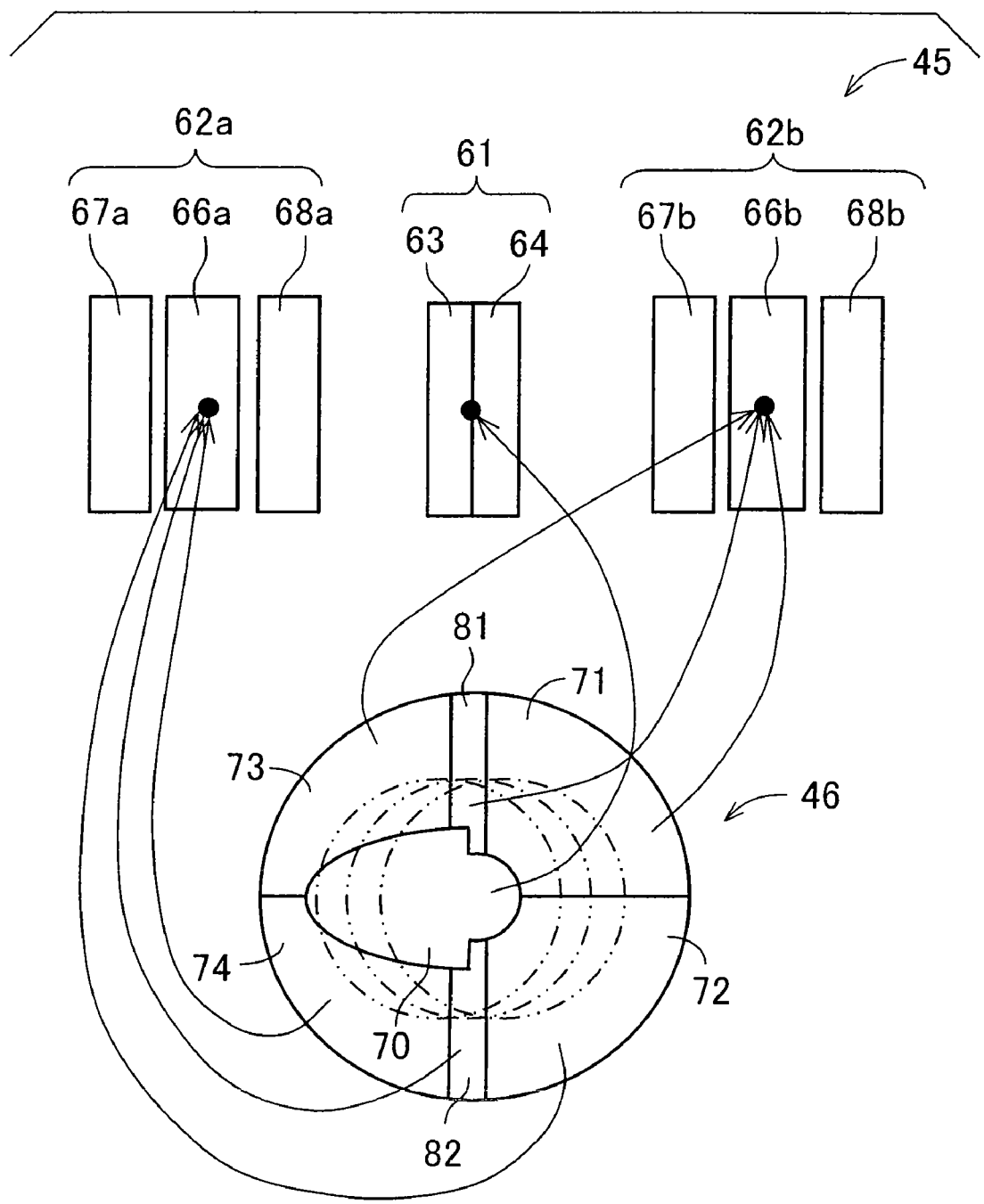
FIG. 4 is a view showing a relation between the diffracting portion and the light receiving portion.

FIG. 4 is a view showing a relation between the diffracting portion 46 and the light receiving portion 45. In FIG. 4, for simplifying understanding, the reflected light from the non-light-collecting recording layer 41b is omitted, and only the reflected light from the light-collecting recording layer 41a is shown. On the diffracting portion 46 enter the reflected light of the main light beam 50 from the light-collecting recording layer 41a and the reflected lights of the respective sub light beams 51 and 52 from the light-collecting recording layer 41a.

The reflected light of the main light beam 50 from the light-collecting recording layer 41a is diffracted by the FES diffracting portion 70, and the first to the sixth TES diffracting portions 71 to 74, 81, and 82. Diffraction light from the FES diffracting portion 70 arrives at near the boundary line 65 between the respective main light beam receiving elements 63 and 64 of the FES light receiving portion 61 in a state of being collected. Diffraction light from the first TES diffracting portion 71 arrives at the main light beam receiving element 66b of the second TES light receiving portion 62b in a state of being collected. Diffraction light from the second TES diffracting portion 72 arrives at the main light beam receiving element 66a of the first TES light receiving portion 62a in a state of being collected. Diffraction light from the third TES diffracting portion 73 arrives at the main light beam receiving element 66b of the second TES light receiving portion 62b in a state of being collected. Diffraction light from the fourth TES diffracting portion 74 arrives at the main light beam receiving element 66a of the first TES light receiving portion 62a in a state of being collected. Diffraction light from the fifth TES diffracting portion 81 arrives at the main light beam receiving portion 66b of the second TES light receiving portion 62b in a state of being collected. Diffraction light from the sixth TES diffracting portion 82 arrives at the main light beam receiving portion 66a of the first TES light receiving portion 62a in a state of being collected.

The reflected lights of the respective sub light beams 51 and 52 from the light-collecting recording layer 41a are diffracted by the FES diffracting portion 70, and the first to the sixth TES diffracting portions 71 to 74, 81, and 82. Respective diffraction lights from the FES diffracting portion 70 reach a portion between the first TES light receiving portion 62a and the FES light receiving portion 61 and a portion between the second TES light receiving portion 62b and the FES light receiving portion 61, in a state of being collected. Respective diffraction lights from the first TES diffracting portion 71 reach the respective sub light beam receiving elements 67b and 68b of the second TES light receiving portion 62b in a state of being collected. Respective diffraction lights from the second TES diffracting portion 72 reach the respective sub light beam receiving elements 67a and 68a of the first TES light receiving portion 62a in a state of being collected. Respective diffraction lights from the third TES diffracting portion 73 reach the respective sub light beam receiving elements 67b and 68b of the second TES light receiving portion 62b in a state of being collected. Respective diffraction lights from the fourth TES diffracting portion 74 reach the respective sub light beam receiving elements 67a and 68a of the first TES light receiving portion 62a in a state of being collected. Respective diffraction lights from the fifth TES diffracting portion 81 reach the respective sub light beam receiving elements 67b and 68b of the second TES light receiving portion 62b in a state of being collected. Respective diffraction lights from the sixth TES diffracting portion 82 reach the respective sub light beam receiving portions 67a and 68a of the first TES light receiving portion 62a in a state of being collected.

The focusing error signal is produced according to a knife-edge method. In the knife-edge method, the focusing error signal is obtained by taking a difference between light receiving results S63 and S64 produced by the respective main light beam receiving elements 63 and 64 of the FES light receiving portion 61. Specifically, the focusing error signal FES is obtained by a calculation according to the following formula (1):

$$FES = S63 - S64 \tag{1}$$

When the light emitted from the light source 43 is focused, on a side where the light source 43 is located, that is, a near side, before the light-collecting recording layer 41a, the reflected light from the light-collecting recording layer 41a is focused before the FES light receiving portion 61. At this time, the light receiving result S64 produced by the second main light beam receiving element 64 is greater than the light receiving result S63 produced by the first main light beam receiving element 63, resulting in that the focusing error signal FES becomes negative.

On the other hand, when the light emitted from the light source 43 is focused, on a side that is opposite to the side where the light source 43 is located, that is, a far side, virtually behind the light-collecting recording layer 41a, the reflected light from the light-collecting recording layer 41a is focused virtually behind the FES light receiving portion 61. At this time, the light receiving result S63 produced by the first main light beam receiving element 63 is greater than the light receiving result S64 produced by the second main light beam receiving element 64, resulting in that the focusing error signal FES becomes positive.

The tracking error signal is produced according to a differential phase detection (abbreviated as DPD) method or a differential push pull (abbreviated as DPP) method. The DPD method and the DPP method are selectively used in accordance with types of the optical disc 42 or the like. For example, the DPD method is used when information is reproduced from the optical disc 42 such as a DVD-ROM, and a DVD-R, a DVD+R, a DVD-RW and a DVD+R that have been already recorded, and the DPP method is used when information is recorded on the optical disc 42 such as a DVD-R, a DVD+R, a DVD-RW and a DVD+RW that have been not recorded and when information is reproduced from a DVD-RAM.

In the DPD method, the tracking error signal is obtained by taking a phase difference between a change in light receiving result S66a produced by the main light beam receiving element 66a of the first TES light receiving portion 62a and a change in light receiving result S66b produced by the main light beam receiving element 66b of the second TES light receiving portion 62b. Specifically, the tracking error signal TES produced by the DPD method (DPD) is obtained by a calculation according to the following formula (2):

$$TES(DPD)=ph(S66a-S66b) \qquad (2)$$

where ph means to take a phase difference.

In the DPP method, the tracking error signal is obtained based on the light receiving results S66a, S67a, and S68a produced by the respective light receiving elements 66a to 68a of the first TES light receiving portion 62a, and the light receiving results S66b, S67b, and S68b produced by the respective light receiving elements 66b to 68b of the second TES light receiving portion 62b. Specifically, the tracking error signal TES produced using the DPP method (DPP) is calculated according to the following formula (3):

$$TES(DPP)=(S66a-S66b)-k \times \{(S67a-S67b)+(S68a-S68b)\} \qquad (3)$$

In the formula (3), (S66a–S66b) represents a push-pull signal of the main light beam 50. (S67a–S67b) and (S68a–S68b) represent push-pull signals of the respective sub light beams 51 and 52. When the DPP method is used, the grating grooves of the light splitting portion 53 are set with an interval secured therebetween so that a phase of the push-pull signals of the respective sub light beams 51 and 52 is shifted by 180 degrees with respect to a phase of the push-pull signal of the main light beam 50. Thereby, it is possible to cancel an offset that occurs in the tracking error signal and that is caused by a shift of the objective lens 57. In the formula, k represents a coefficient for compensating a difference between the light intensities of the main light beam 50, and the sub light beams 51 and 52. When an intensity ratio is such that a ratio of the main light beam 50 in relative to one of the sub light beams 51 in relative to the other sub light beam 52 is a:b:b, the coefficient k is a/(2b). The coefficient k can be determined based on the depth of the grating grooves on the light separating portion 53.

In the embodiment, not only the diffraction lights from the first and the second TES diffracting portions 71 and 72 but also the diffraction lights from the third and the fourth TES diffracting portions 73 and 74 reach the first and the second TES light receiving portions 62a and 62b. Accordingly, it is possible to compensate for a decrease in the respective push-pull signals, wherein the decrease is included by setting the fifth and the sixth TES diffracting portions 81 and 82. As a result, this makes it possible to prevent deterioration in a property of the tracking error signal.

An information reproducing signal is obtained by summing up the light receiving results S63 and S64 produced by the respective main light beam receiving elements 63 and 64 of the FES light receiving portion 61, the light receiving result S66a produced by the main light beam receiving element 66a of the first TES light receiving portion 62a, and the light receiving result S66b produced by the main light beam receiving element 66b of the second TES light receiving portion 62b. Specifically, the information reproducing signal RF is obtained by the following formula (4):

$$RF=S63+S64+S66a+S66b \qquad (4)$$

Figure 5:
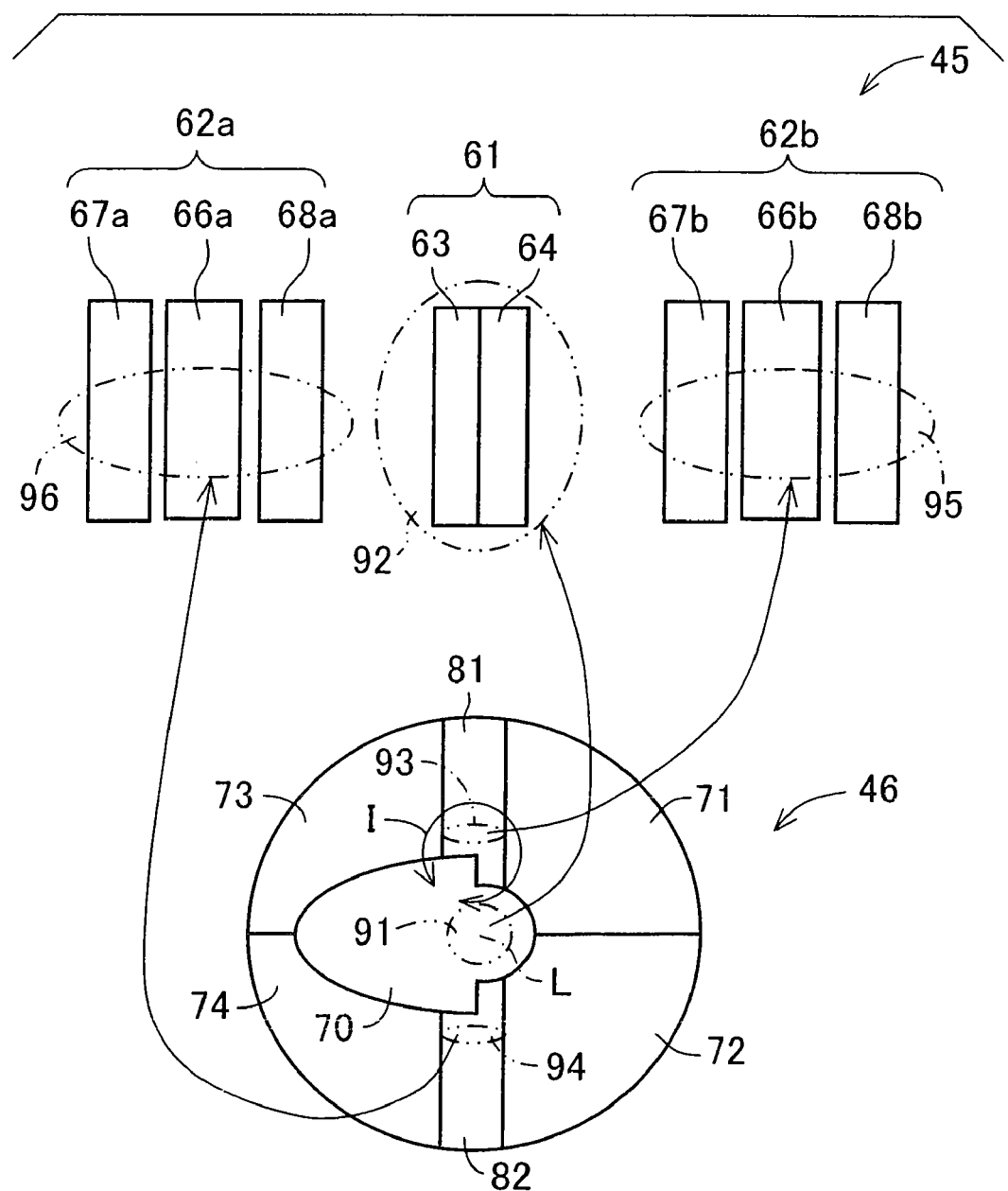
FIG. 5 is a view for explaining a light-receiving state of a reflected light from a non-light-collecting recording layer.

FIG. 5 is a view for explaining a light-receiving state of the reflected light from the non-light-collecting recording layer 41b. In FIG. 5, for simplifying the understanding, the reflected light from the light-collecting recording layer 41a is omitted, and only the reflected light from the non-light-collecting recording layer 41b is shown. In FIG. 5, for further simplifying the understanding, the reflected lights of the respective sub light beams 51 and 52 from the non-light-collecting recording layer 41b are omitted, and only the reflected light of the main light beam 50 from the non-light-collecting recording layer 41b is shown. In FIG. 5, it is assumed that the non-light-collecting recording layer 41b is disposed behind the light-collecting recording layer 41a when the optical disc 42 is viewed from the side where the light source 43 is located.

The reflected light from the non-light-collecting recording layer 41b becomes stray light. Such reflected light from the non-light-collecting recording layer 41b causes a noise component and an offset component especially in the tracking error signal, resulting in that the property of the tracking servo is deteriorated. The zero-order diffraction light of the main light beam 50 from the non-light-collecting recording layer 41b, and the first-order diffraction light of the main light beam 50 from the non-light-collecting recording layer 41b enter on the diffracting portion 46. The first-order diffraction light includes ±first-order diffraction lights.

The zero-order diffraction light of the main light beam 50 from the non-light-collecting recording layer 41b forms a light spot 91 near the reference optical axis L on the diffracting portion 46. The light spot 91 is formed only on the FES diffracting portion 70 among the respective diffracting portions 70, 71 to 74, 81, and 82 of the diffracting portion 46. Conversely, a shape and a dimension of the diffracting portion 46, especially of the projected portion 77 of the FES diffracting portion 70 are set so that the light spot 91 is formed only on the FES diffracting portion 70.

The region 91 on which the zero-order diffraction light from the non-light-collecting recording layer enters, is a region that is near the reference optical axis L and is important in utilizing the reflected light from the light-collecting recording layer 41a. In the embodiment, this region is included in the FES diffracting portion 70, resulting in that it is possible to utilize the reflected light from the light-collecting recording layer 41a effectively. Consequently, a stable focus servo control can be performed when information is recorded and/or reproduced on and from the optical disc 42.

The light spot 91 is enlarged or reduced with a change in an interval between the light-collecting recording layer 41a and the non-light-collecting recording layer 41b is changed. A shape and a dimension of the FES diffracting portion 70 are set so that the light spot 91 is formed only on the FES diffracting portion 70 even when the light spot 91 is enlarged or reduced in this way. In the embodiment, the shape and the dimension of the FES diffracting portion 70 are set so that the light spot 91 is formed only on the FES diffracting portion 70 even when the interval fluctuates by approximately ±15 μm.

The FES diffracting portion 70 is thus formed, thus making it possible to, regardless of the fluctuation in the interval, prevent that the zero-order diffraction light of the main light beam 50 from the non-light-collecting recording layer 41b is diffracted by the first to the sixth TES diffracting portions 71 to 74, 81, and 82 and thereafter is undesirably received by the first and the second TES light receiving portions 62a and 62b. As a result, it is possible to prevent the zero-order diffraction light of the main light beam 50 from the non-light-collecting recording layer 41b from giving the adverse effects on the tracking error signal. Accordingly, the stable tracking servo control can be performed when information is recorded and/or reproduced on and from the optical disc 42.

The zero-order diffraction light of the main light beam 50 from the non-light-collecting recording layer 41b is diffracted by the FES diffracting portion 70. Of the zero-order diffraction light of the main light beam 50 from the non-light-collecting recording layer 41b, the diffraction light from the FES diffracting portion 70 reaches the FES light receiving portion 61 and forms a light spot 92 on the FES light receiving portion 61. The light spot 92 is larger than the light spot formed by the reflected light of the main light beam 50 from the light-collecting recording layer 41a. In the embodiment, of the zero-order diffraction light of the main light beam 50 from the non-light-collecting recording layer 41b, the diffraction light from the FES diffracting portion 70 is received by the respective main light beam receiving elements 63 and 64 in the FES light receiving portion 61.

The ±first-order diffraction lights of the main light beam 50 from the non-light-collecting recording layer 41b form light spots 93 and 94 respectively on either side of the diffracting portion 46 with respect to the reference optical axis L when viewed in the tracking direction T1. The light spot 93 caused by the +first-order diffraction light is formed only on the fifth TES diffracting portion 81 among the diffracting portions 70, 71 to 74, 81, and 82 of the diffracting portion 46. Conversely, a shape and a dimension of the diffracting portion 46, especially of the fifth TES diffracting portion 81, are set so that the light spot 93 is formed only on fifth TES diffracting portion 81. In addition, the light spot 94 by the –first-order diffraction light is formed only on the sixth TES diffracting portion 82 among the diffracting portions 70, 71 to 74, 81, and 82 of the diffracting portion 46. Conversely, a shape and a dimension of the diffracting portion 46, especially of the sixth TES diffracting portion 82, are set so that the light spot 94 is formed only on the sixth TES diffracting portion 82.

The +first-order diffraction light of the main light beam 50 from the non-light-collecting recording layer 41b is diffracted by the fifth TES diffracting portion 81. Of the +first-order diffraction light of the main light beam 50 from the non-light-collecting recording layer 41b, the diffraction light from the fifth TES diffracting portion 81 reaches the second TES light receiving portion 62b and forms a light spot 95 on the second TES light receiving portion 62b. The light spot 95 is larger than the respective light spots formed by the reflected lights of the respective light beams 50 to 52 from the light-collecting recording layer 41a. In the embodiment, of the +first-order diffraction light of the main light beam 50 from the non-light-collecting recording layer 41b, the diffraction light from the fifth TES diffracting portion 81 is received by the main light beam receiving element 66b and the respective sub light beam receiving elements 67b and 68b in the second TES light receiving portion 62b.

The –first-order diffraction light of the main light beam 50 from the non-light-collecting recording layer 41b is diffracted by the sixth TES diffracting portion 82. Of the –first-order diffraction light of the main light beam 50 from the non-light-collecting recording layer 41b, the diffraction light from the sixth TES diffracting portion 82 reaches the first TES light receiving portion 62a and forms a light spot 96 on the first FES light receiving portion 62a. The light spot 96 is larger than the respective light spots formed by the reflected lights of the respective light beams 50 to 52 from the light-collecting recording layer 41a. In the embodiment, of the –first-order diffraction light of the main light beam 50 from the non-light-collecting recording layer 41b, the diffraction light from the sixth TES diffracting portion 82 is received by the main light beam receiving element 66a and the respective sub light beam receiving elements 67a and 68a in the first TES light receiving portion 62a.

In this way, the first-order diffraction lights from the non-light-collecting recording layer 41b enter on the fifth and the sixth TES diffracting portions 81 and 82, and then are diffracted toward the first and the second TES light receiving portions 62a and 62b by the fifth and the sixth TES diffracting portions 81 and 82. Thereby, it is possible to reduce light-receiving amounts of the first-order diffraction lights from the non-light-collecting recording layer 41b received by the first and second TES light receiving portions 62a and 62b. Accordingly, it is possible to prevent the first-order diffraction lights from the non-light-collecting recording layer 41b from giving the adverse effects. Specifically, it is possible to prevent the first-order diffraction lights from the non-light-collecting recording layer 41b from giving the adverse effects on the tracking error signal, resulting in that a stable tracking servo control can be performed when information is recorded and/or reproduced on and from the optical disc 42.

The light intensities of the respective sub light beams 51 and 52 are lower than the light intensity of the main light beam 50, and are approximately one tenth of the intensity of the main light beam 50. Accordingly, in order to obtain the tracking error signal with the DPP method, the respective light receiving results S67a, S68a, S67b, and S68b produced by the respective sub light beam receiving elements 67a, 68a, 67b, and 68b, are compensated by the coefficient k, as shown in the formula (3). Thus, in a case where stray lights reach the respective sub light beam receiving elements 67a, 68a, 67b, and 68b, influences of the stray lights become serious. In view of this point, it is possible to reduce, in the above-described way, the light-receiving amounts of the first-order diffraction lights from the non-light-collecting recording layer 41b received by the respective sub light beam receiving elements 67a, 68a, 67b, and 68b. Consequently, it is possible to effectively suppress the adverse effects caused by the first-order diffraction lights from the non-light-collecting recording layer 41b.

The reflected light from the light-collecting recording layer 41a also enters on the fifth and the sixth TES diffracting portions 81 and 82. A part of the light that has entered on the fifth and the sixth TES diffracting portions 81 and 82 reaches the first and the second TES light receiving portions 62a and 62b. Accordingly, it is possible to utilize the reflected light from the light-collecting recording layer 41a more effectively, compared with a case where the light that has entered on the fifth and sixth TES diffracting portions 81 and 82 is completely prevented from reaching the light receiving portion 45. As a result, it is possible to improve the property of the tracking error signal, in other words, the intensity of the tracking error signal, resulting in that a stable tracking servo control can be performed when information is recorded and/or reproduced on and from the optical disc 42. In the embodiment, it is especially possible to increase the light-receiving amounts of the sub light beams 51 and 52 that are used for the tracking error signal. This thereby makes it possible to effectively improve the property of the tracking error signal.

In such an embodiment as has been described, diffraction regions having different diffraction efficiencies are disposed in the diffracting portion 46, thus suppressing the adverse effects caused by the first-order diffraction lights from the non-light-collecting recording layer 41b. Accordingly, there is no need to add any other light receiving elements, thus making it possible to avoid complexity of the structure of the light receiving portion 45. Furthermore, it is also possible to simplify the calculation for obtaining the tracking error signal or the like signal.

Figure 6A:
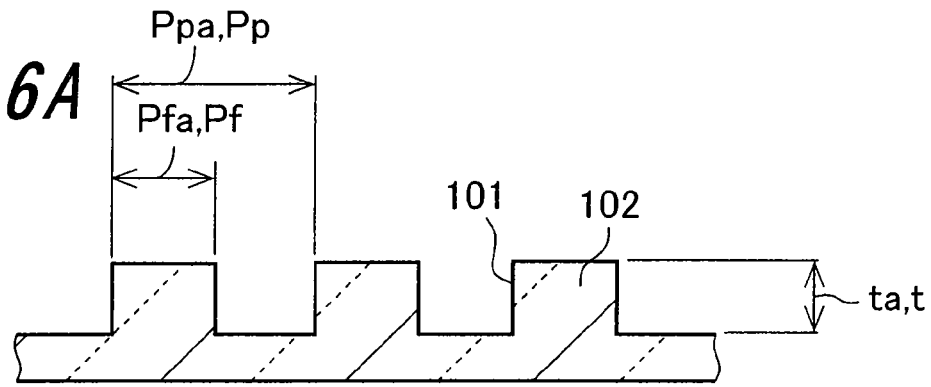
FIGS. 6A to 6C are sectional views showing a part of the diffracting portion.
Figure 6B:
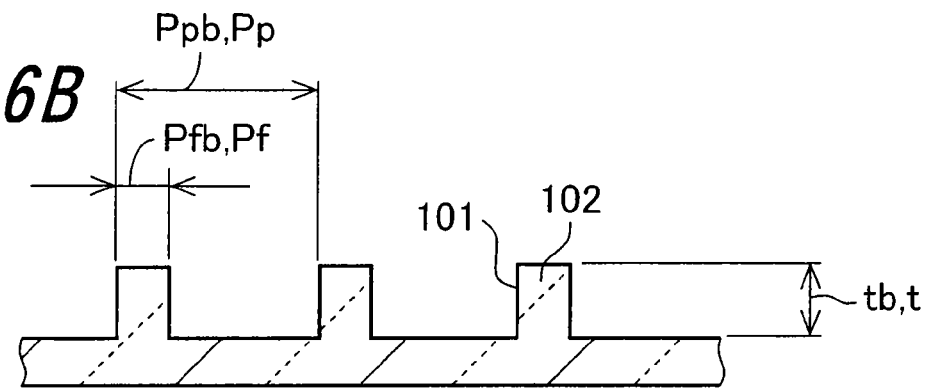
Figure 6C:
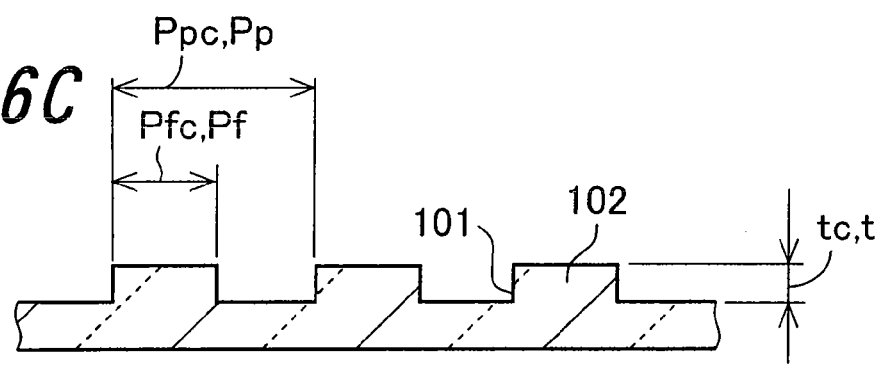

FIGS. 6A to 6C are sectional views showing a part of the diffracting portion 46, FIG. 6A shows the first diffraction region, FIG. 6B shows one example of the second diffraction region, and FIG. 6C shows another example of the second diffraction region. Grating grooves 101 are arranged with equal intervals secured therebetween on the respective diffracting portions 70, 71 to 74, 81, and 82 of the diffracting portion 46. A pattern pitch Pp representing an interval between the grating grooves 101 is determined by optical arrangements of the diffracting portion 46 and the light receiving portion 45. A depth t and a duty ratio D of the grating grooves 101 are determined in accordance with a diffraction efficiency. The duty ratio D refers to a ratio of a width size Pf of a protrusion 102 in relative to the pattern pitch Pp, namely D=Pf/Pp.

The first diffraction region is formed with the grating grooves 101 so that the first diffraction efficiency is obtained. Specifically, depth ta and duty ratio Da of the grating grooves 101 are determined so that the first diffraction efficiency is obtained. In the embodiment, the depth ta and the duty ratio Da of the grating grooves 101 are selected respectively so as to maximize the diffraction efficiency. The depth ta of the grating grooves 101 is selected to be an optimized value. The duty ratio Da is selected to be, specifically, ½ or around ½. In other words, the width dimension of the protrusion 102 between the grating grooves 101 is selected to be ½ of the pattern pitch.

The second diffraction region is formed with the grating grooves 101 so that the second diffraction efficiency which is lower than the first diffraction efficiency is obtained. Specifically, the depth t and the duty ratio D of the grating grooves 101 are determined so that the second diffraction efficiency is obtained.

In the one example, as shown in FIG. 6B, the duty ratio D is changed, compared to the first diffraction region shown in FIG. 6A. In other words, the first diffraction region and the second diffraction region have different duty ratios D and the same depth t of the grating grooves 101 (tb=ta). In such an example as has been described, it is possible to set the first diffraction efficiency of the first diffraction region and the second diffraction efficiency of the second diffraction region respectively by setting the duty ratios D. In the embodiment, the duty ratio Db in the second diffraction region is set to be smaller than ½. A similar result is obtained even when the duty ratio Db is set to be greater than ½.

In the another example, as shown in FIG. 6C, the depth t of the grating grooves 101 is changed, compared to the first diffraction region shown in FIG. 6A. In other words, the first diffraction region and the second diffraction region have different depths t of the grating grooves 101 and the same duty ratio D (Dc=Da). In such an another example as has been described, it is possible to set the first diffraction efficiency of the first diffraction region and the second diffraction efficiency of the second diffraction region respectively by the depths t of the grating grooves 101. In the embodiment, the depth tc of the grating grooves 101 in the second diffraction region is selected so that $\eta c < \eta a$ is fulfilled, wherein $\eta a$ is the first diffraction efficiency of the first diffraction region, and $\eta c$ is the second diffraction efficiency of the second diffraction region. $\eta a$ and $\eta c$ are expressed as follows.

$$\eta a = [(2/\pi) \times \sin\{\pi \times ta \times (n-1)/\lambda\}]^2$$

$$\eta c = [(2/\pi) \times \sin\{\pi \times tc \times (n-1)/\lambda\}]^2$$

where n represents a refractive index of the diffracting portion 46, $\lambda$ represents a wavelength of light, and ta represents the depth of the grating grooves 101 in the first diffraction region.

Further, in the another example, both the depth t of the grating grooves 101 and the duty ratio D may be changed, compared to the first diffraction region. Even in this case, similar effects can be obtained.

FIG. 7 is an enlarged front view of Section I in FIG. 5. When the objective lens 57 is driven to be displaced in the tracking direction T1, the light spot 93 on the diffracting portion 46 formed by the +first-order diffraction light from the non-light-collecting recording layer 41b is displaced in the tracking direction T1 as shown in FIG. 7. In the embodiment, a shape and a dimension of the fifth TES diffracting portion 81 are set so that the light spot 93 is formed only on fifth TES diffracting portion 81 even when the objective lens 57 is driven to be displaced in the tracking direction T1. The sixth TES diffracting portion 82 is also set in the same way.

In this way, the fifth and sixth TES diffracting portions 81 and 82 are disposed so that the first-order diffraction lights from the non-light-collecting recording layer 41b enter thereon even when the objective lens 57 is driven to be displaced in the tracking direction T1. Consequently, regardless of the displacement of the objective lens 57, it is possible to suppress the adverse effects caused by the first-order diffraction lights from the non-light-collecting recording layer 41b.

FIG. 8 is an enlarged front view of Section I in FIG. 5. For example, a change in the interval between the light-collecting recording layer 41a and the non-light-collecting recording layer 41b causes a change in a radiation range of the light emitted from the light source 41 formed on the non-light-collecting recording layer 41b. When the radiation range is changed, the light spot 93 on the diffracting portion 46 formed by the +first-order diffraction light from the non-light-collecting recording layer 41b is enlarged or reduced as shown in FIG. 8. In the embodiment, the shape and the dimension of the fifth TES diffracting portion 81 are set so that the light spot 93 is formed only on fifth TES diffracting portion 81 even when the radiation range is changed. The sixth TES diffracting portion 82 is also set in the same way.

As described above, the fifth and sixth TES diffracting portions 81 and 82 are disposed so that the first-order diffraction lights from the non-light-collecting recording layer 41b enter thereon even when the radiation range is changed. Accordingly, regardless of the change in the radiation range, it is possible to suppress the adverse effects caused by the first-order diffraction lights from the non-light-collecting recording layer 41b.

FIG. 9 is an enlarged front view of Section I in FIG. 5. In FIG. 9 are shown not only the +first-order diffraction light of the main light beam 50 from the non-light-collecting recording layer 41b, but also the +first-order diffraction lights of the respective sub light beams 51 and 52 from the non-light-collecting recording layer 41b. The +first-order diffraction lights of the respective sub light beams 51 and 52 from the non-light-collecting recording layer 41b form light spots 105 and 106 on the diffracting portion 46, respectively. The respective light spots 105 and 106 are shifted on the diffracting portion 46 to either side in the tangential direction T2, of the light spot 93 formed by the +first-order diffraction light of the main light beam 50 from the non-light-collecting recording layer 41b.

In the embodiment, the shape and the dimension of the fifth TES diffracting portion 81 are set so that both the light spot 93 caused by the +first-order diffraction light of the main light beam 50 from the non-light-collecting recording layer 41b, and the respective light spots 105 and 106 caused by the +first-order diffraction lights of the respective sub light beams 51 and 52 from the non-light-collecting recording layer 41b, are formed only on the fifth TES diffracting portion 81. The sixth TES diffracting portion 82 is also set in the same way.

As described above, the fifth and sixth TES diffracting portions 81 and 82 are disposed so that both the first-order diffraction light of the main light beam 50 from the non-light-collecting recording layer 41b, and the first-order diffraction lights of the respective sub light beams 51 and 52 from the non-light-collecting recording layer 41b enter thereon. As a result, it is possible to suppress the adverse effects caused by the reflected lights from the non-light-collecting recording layer 41b as feasibly as possible.

Figure 10:
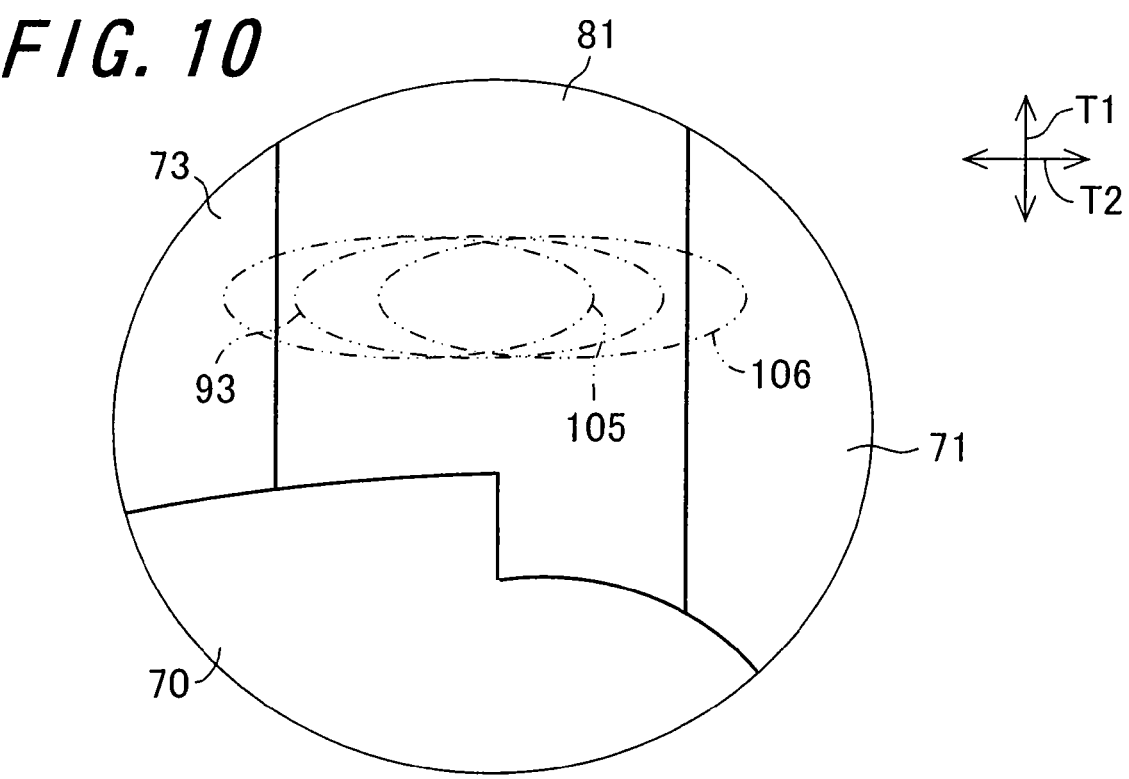
FIG. 10 is a front view showing an enlarged part of a diffracting portion provided in an optical pickup apparatus according to a second embodiment of the invention.

FIG. 10 is a front view showing an enlarged part of a diffracting portion provided in an optical pickup apparatus according to a second embodiment of the invention. Since the optical pickup apparatus according to the embodiment is similar to the optical pickup apparatus 40 according to the first embodiment described above, identical portions will be identified with the same reference symbols and overlapping descriptions will be omitted.

The main light beam 50 has a high light intensity, whereas the sub light beams 51 and 52 have low light intensities. Accordingly, the adverse effects caused by the first-order diffraction light of the main light beam 50 from the non-light-collecting recording layer 41b are large, whereas the adverse effects caused by the first-order diffraction lights of the sub light beams 51 and 52 from the non-light-collecting recording layer 41b are small. Such points as have been mentioned are taken into consideration in this embodiment.

In the embodiment, shapes and dimensions of the fifth TES diffracting portion 81, and the first and third TES diffracting portions 71 and 73 are set so that the light spot 93 caused by the +first-order diffraction light of the main light beam 50 from the non-light-collecting recording layer 41b is formed only on the fifth TES diffracting portion 81, and the respective light spots 105 and 106 caused by the +first-order diffraction lights of the respective sub light beams 51 and 52 from the non-light-collecting recording layer 41b deviates from the fifth TES diffracting portion 81 and are partially formed on the first and the third TES diffracting portions 71 and 73 but not completely on the fifth TES diffracting portion 81. The sixth TES diffracting portion 82, and the second and the fourth TES diffracting portions 72 and 74 are also set in the same way.

As described above, the fifth and sixth TES diffracting portions 81 and 82 are disposed so that the first-order diffraction lights of the main light beam 50 from the non-light-collecting recording layer 41b enter thereon. As a result, it is possible to effectively suppress the adverse effects caused by the reflected light from the non-light-collecting recording layer 41b. In addition, the first to the sixth TES diffracting portions 71 to 74, 81, and 82 are disposed so that the first-order diffraction lights of the sub light beams 51 and 52 from the non-light-collecting recording layer 41b deviates from the fifth and the sixth TES diffracting portions 81 and 82, and further partially enter on the first to fourth TES diffracting portions 71 to 74, but not completely on the fifth and the sixth TES diffracting portions 81 and 82. As a result, it is possible to effectively utilize the reflected light from the light-collecting recording layer 41a, by making the first to the fourth TES diffracting portions 71 to 74 as large as possible so that the reflected light from the light-collecting recording layer 41a is diffracted by the first to the fourth TES diffracting portions 71 to 74 as much as possible.

Figure 11:
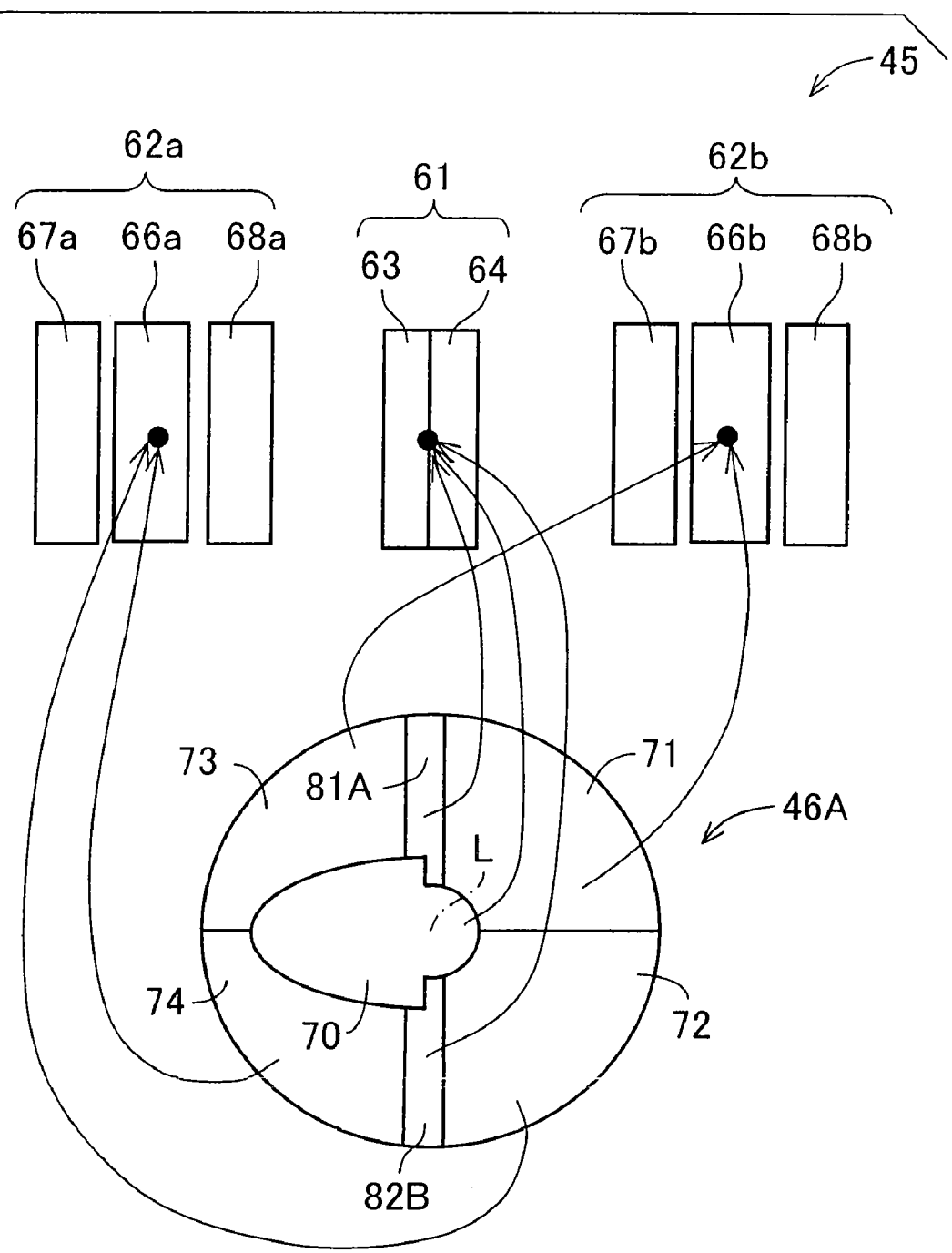
FIG. 11 is a view showing a relation between a diffracting portion and the light receiving portion in an optical pickup apparatus according to a third embodiment of the invention.
Figure 13:
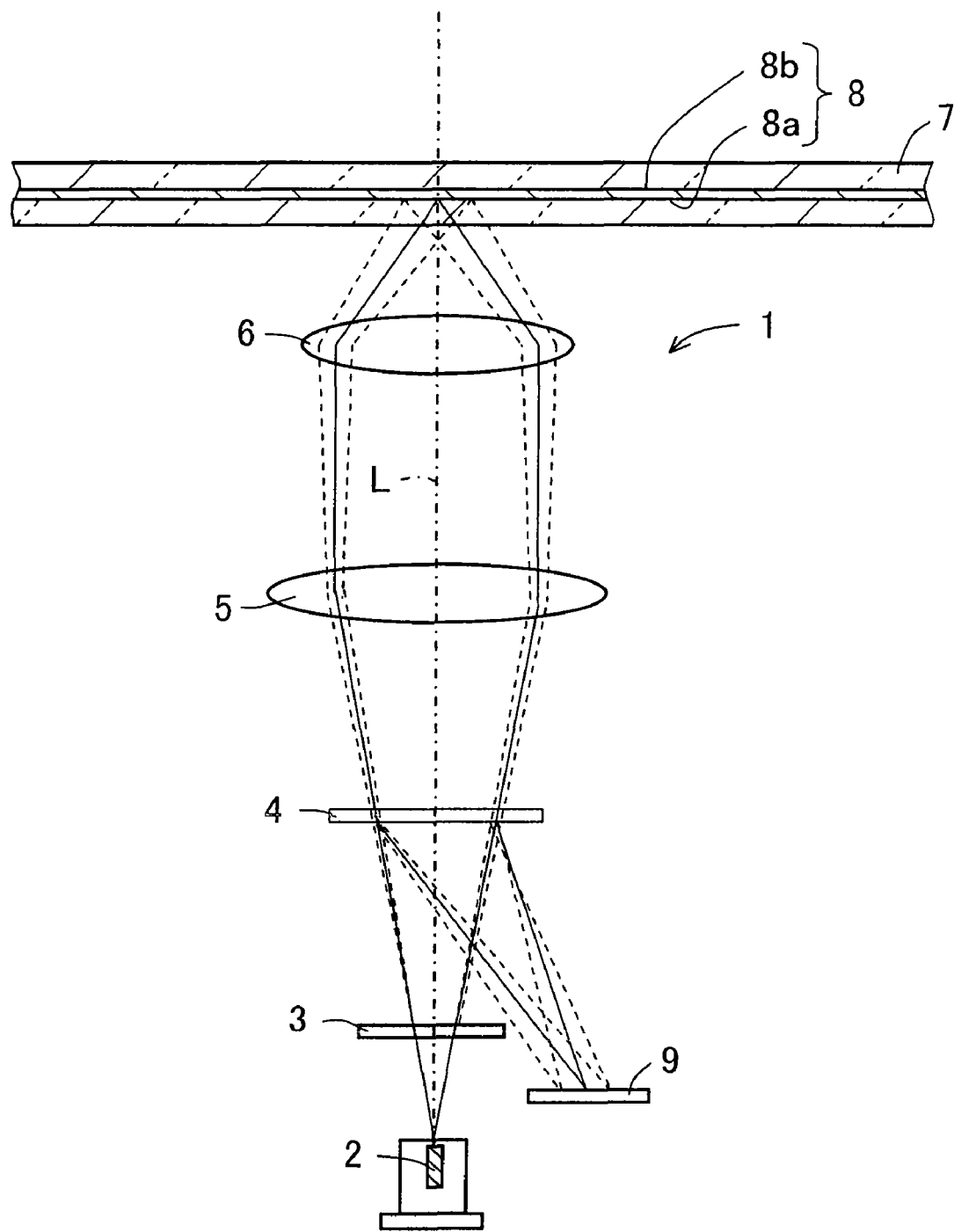
FIG. 13 is a view schematically showing a configuration of a conventional optical pickup apparatus.
Figure 14:
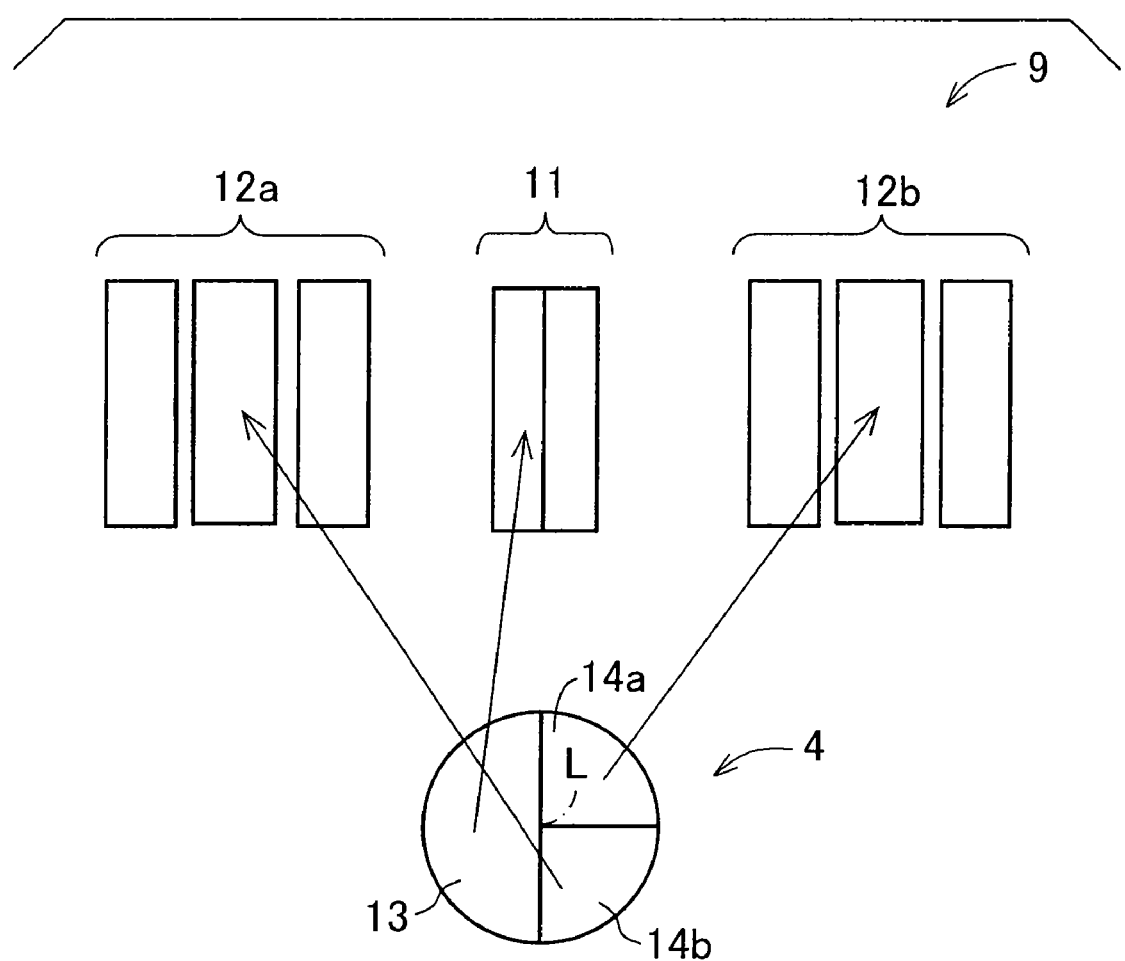
FIG. 14 is a view showing a relation between a hologram element and a light receiving portion.
Figure 15:
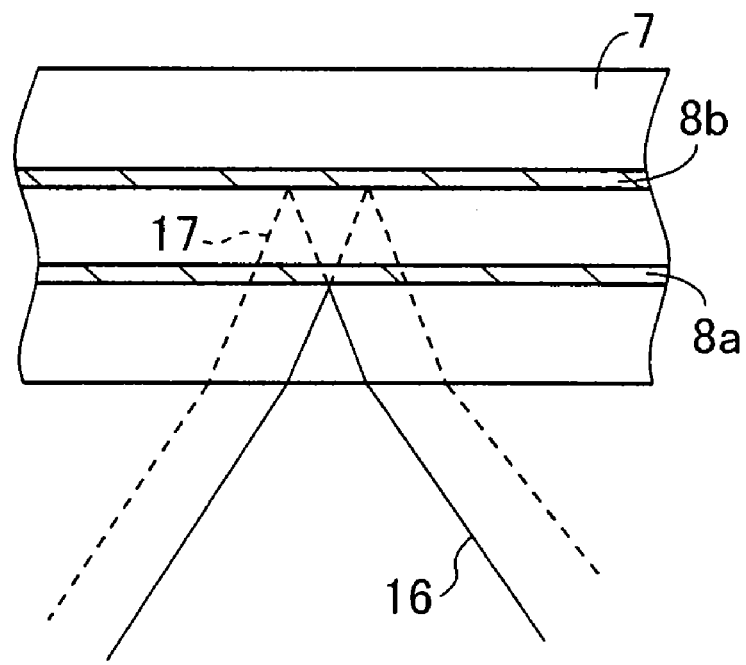
FIG. 15 is a view for explaining an overview of a transmittance and a reflection of light in an optical disc having two recording layers.

FIG. 11 is a view showing a relation between a diffracting portion 46A and the light receiving portion 45 in an optical pickup apparatus according to a third embodiment of the invention. Since the optical pickup apparatus according to this embodiment is similar to the optical pickup apparatus 40 according to the first embodiment described above, identical portions will be identified with the same reference symbols, overlapping descriptions will be omitted, and only different features therebetween will be described.

In the embodiment, the fifth and the sixth TES diffracting portions 81 and 82 included in the second diffraction region are replaced with a second and a third FES diffracting portions 81A and 82A for diffracting the reflected light from the light-collecting recording layer 41a toward the FES light receiving portion 61. Lights that have been diffracted by the second and the third FES diffracting portions 81A and 82A reach the FES light receiving portion 61. Accordingly, it is possible to prevent the first-order diffraction lights from the non-light-collecting recording layer 41b from giving the adverse effects on the focusing error signal. In addition, it is also possible to utilize the reflected light from the light-collecting recording layer 41a more effectively, compared with a case where the reflected light that has entered on the second and the third FES diffracting portions 81A and 82B is completely prevented from reaching the light receiving portion 45.

FIG. 12 is a front view showing a configuration of a diffracting portion 46B provided in an optical pickup apparatus according to a fourth embodiment of the invention. Since the optical pickup apparatus according to the embodiment is similar to the optical pickup apparatus 40 according to the third embodiment described above, identical portions will be identified with the same reference symbols, overlapping descriptions will be omitted, and only different features will be described.

In the embodiment, the first diffraction region has the first to the fourth TES diffracting portions 71 to 74, and the second diffraction region has an FES diffracting portion 70B. The FES diffracting portion 70B is so formed as to include the FES diffracting portion 70, and the second and the third FES diffracting portions 81A and 82A in the above-described third embodiment.

In such an embodiment as has been described, the FES diffracting portion 70B includes the region 91 on which the zero-order diffraction light from the non-light-collecting recording layer 41b enters, and the regions 93 and 94 on which the first-order diffraction lights from the non-light-collecting recording layer 41b enter. It is possible to reduce number of dividing the diffracting portion 46B by configuring the FES diffracting portion 70B in the above-mentioned way. Accordingly, it is possible to decrease number of manufacturing steps of the diffracting portion 46B, thus making it possible to reduce manufacturing cost.

Each of the embodiments mentioned above is merely illustrative in the invention and configuration may be changed within the range of the invention. For example, each of the embodiments mentioned above is explained under an assumption that the optical disc is a single-sided double-layer disc, however, the invention is not limited thereto. For example, three recording layers or more may be formed in the optical disc. In addition, the optical recording medium is not limited to the optical disc, but may be a diffraction element.

The diffracting portion 46 may be configured so as to have different diffraction efficiencies in response to a polarization direction of incident light. Thereby, it is possible for the diffracting portion 46 to substantially transmit lights from the light source 43 toward the optical disc 42. In addition, a quarter-wave plate is disposed between the optical disc 42 and the diffracting portion 46, resulting in that it is possible to diffract the reflected light from the respective recording layers 41 of the optical disc 42 at high diffraction efficiency. In this way, the lights from the light source 43 toward the optical disc 42 are substantially transmitted and the reflected lights from the respective recording layers 41 in the optical disc 42 are diffracted at the high diffraction efficiency, resulting in that a utilization efficiency of light can be enhanced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical pickup apparatus for irradiating an optical recording medium having a plurality of recording layers with light and recording information on a recording layer of the optical recording medium or reproducing information from the recording layer of the optical recording medium, the optical pickup apparatus comprising:
    a light source for emitting light;
    a lens system for collecting light emitted from the light source onto the recording layer of the optical recording medium and transmitting reflected light from the recording layer of the optical recording medium;
    a light receiving portion for receiving the reflected light from the recording layer of the optical recording medium;
    a diffracting portion for diffracting the reflected light from the recording layer of the optical recording medium toward the light receiving portion, the diffracting portion being disposed in an optical path between the light source and the optical recording medium; and
    a light splitting portion for splitting the light emitted from the light source into a main light beam and a sub light beam,
    wherein the diffracting portion includes:
    a first diffraction region having a first diffraction efficiency; and
    a second diffraction region having a second diffraction efficiency lower than the first diffraction efficiency, the second diffraction region being disposed so that first-order diffraction light from a non-light-collecting recording layer enters thereon, the non-light-collecting recording layer being another layer than a light-collecting recording layer which is currently involved in collection of the light emitted from the light source,
    wherein the second diffraction region is disposed so that the first-order diffraction light of the main light beam from the non-light-collecting recording layer enters thereon while a part of the first-order diffraction light of the sub light beam from the non-light-collecting recording layer does not enter thereon, and
    wherein the first diffraction region is disposed so that the part of the first-order diffraction light of the sub light beam from the non-light-collecting recording layer enters thereon.

2. The optical pickup apparatus of claim 1, wherein the lens system has a light collecting element that is driven to be displaced in a tracking direction, and the second diffraction region is disposed so that the first-order diffraction light from the non-light-collecting recording layer enters thereon even when the light collecting element is driven to be displaced in the tracking direction.

3. The optical pickup apparatus of claim 1, wherein the second diffraction region is disposed so that the first-order diffraction light from the non-light-collecting recording layer enters thereon even when a radiation range of the light emitted from the light source formed on the non-light-collecting recording layer is changed.

4. The optical pickup apparatus of claim 1, wherein the first diffraction region includes a region on which zero-order diffraction light from the non-light-collecting recording layer enters.

5. The optical pickup apparatus of claim 1, wherein the second diffraction region includes a region on which the zero-order diffraction light from the non-light-collecting recording layer enters, and a region on which the first order diffraction light from the non-light-collecting recording layer enters.

6. The optical pickup apparatus of claim 1, wherein a depth of grating groove in the first diffraction region is different from that of grating groove in the second diffraction region.

7. The optical pickup apparatus of claim 1, wherein the first diffraction region and the second diffraction region have different duty ratios.

8. The optical pickup apparatus of claim 1, wherein the light receiving portion has a light receiving portion for tracking that is used for generating a tracking error signal, and
    the second diffraction region diffracts the reflected light from the recording layer of the optical recording medium toward the light receiving portion for tracking.

9. The optical pickup apparatus of claim 1, wherein the light receiving portion has a light receiving portion for focusing that is used for generating a focusing error signal, and
    the second diffraction region diffracts the reflected light from the recording layer of the optical recording medium toward the light receiving portion for focusing.

10. The optical pickup apparatus of claim 1, further comprising a light splitting portion for splitting the light emitted from the light source into a main light beam and a sub light beam,
    wherein the second diffraction region is disposed so that both the first-order diffraction light of the main light beam from the non-light-collecting recording layer, and the first-order diffraction light of the sub light beam from the non-light-collecting recording layer, enter thereon.

* * * * *